(12) United States Patent
Kimura et al.

(10) Patent No.: US 7,593,307 B2
(45) Date of Patent: Sep. 22, 2009

(54) OBJECTIVE OPTICAL SYSTEM FOR OPTICAL PICKUP APPARATUS, OPTICAL PICKUP APPARATUS, DRIVING APPARATUS FOR OPTICAL INFORMATION RECORDING MEDIUM, CONDENSER LENS AND OPTICAL PATH COMPOUNDING ELEMENT

(75) Inventors: Tohru Kimura, Hachioji (JP); Junji Hashimura, Sagamihara (JP); Yuichi Atarashi, Hachioji (JP); Toshiyuki Kojima, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 943 days.

(21) Appl. No.: 11/100,389

(22) Filed: Apr. 7, 2005

(65) Prior Publication Data
US 2005/0226124 A1   Oct. 13, 2005

(30) Foreign Application Priority Data
Apr. 13, 2004   (JP)   ............................. 2004-118307

(51) Int. Cl.
*G11B 7/00* (2006.01)

(52) U.S. Cl. .............................. 369/112.24; 369/112.08
(58) Field of Classification Search ............ 369/112.07, 369/112.08, 112.23, 112.24, 44.23
See application file for complete search history.

(56) References Cited

U.S. PATENT DOCUMENTS

| | | | |
|---|---|---|---|
| 6,788,473 B2 * | 9/2004 | Kim et al. ............... | 369/112.26 |
| 6,987,724 B2 * | 1/2006 | Kim et al. ............... | 369/112.26 |
| 7,038,995 B2 * | 5/2006 | Kitamura et al. ........ | 369/112.24 |
| 7,050,379 B2 * | 5/2006 | Takahashi et al. ....... | 369/112.26 |
| 7,177,101 B2 * | 2/2007 | Tanaka et al. ........... | 369/112.23 |
| 2002/0097504 A1 * | 7/2002 | Kitamura et al. ............ | 359/719 |

* cited by examiner

*Primary Examiner*—Thang V Tran
(74) *Attorney, Agent, or Firm*—Finnegan, Henderson, Farabow, Garrett & Dunner, L.L.P.

(57) ABSTRACT

An objective lens system for an optical pickup apparatus, includes in order from an object side: a first lens group having negative paraxial power $P_1$ (mm$^{-1}$); and a second lens group having positive paraxial power $P_2$ (mm$^{-1}$) for converging a light flux emitted from the first lens group on an information recording surface of an optical information recording medium.

22 Claims, 11 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OBJECTIVE OPTICAL SYSTEM FOR OPTICAL PICKUP APPARATUS, OPTICAL PICKUP APPARATUS, DRIVING APPARATUS FOR OPTICAL INFORMATION RECORDING MEDIUM, CONDENSER LENS AND OPTICAL PATH COMPOUNDING ELEMENT

This application claims priority from Japanese Patent Application No. 2004-118307 filed on Apr. 13, 2004, which is incorporated hereinto by reference.

BACKGROUND OF THE INVENTION

The present invention relates to an objective optical system for an optical pickup apparatus capable of conducting recording and/or reproducing of information compatibly for optical information recording media each being different from others, an optical pickup apparatus, a driving apparatus for an optical information recording medium and a condenser lens.

In recent years, there has been an advance of a trend to a shorter wavelength of a laser light source used as a light source for reproducing of information recorded on an optical disc or recording of information on an optical disc, and there has been started a practice of a laser light source with a wavelength 400-420 nm, such as, for example, a violet semiconductor laser and a blue SHG laser that converts a wavelength of an infrared semiconductor laser by the use of a second harmonic. If these violet semiconductor lasers are used, information of 15-20 GB can be recorded on an optical disc having a diameter 12 cm when an objective lens having the same numerical aperture (NA) as in DVD (digital versatile disc) is used, and information of 23-25 GB can be recorded on an optical disc having a diameter 12 cm when NA of the objective lens is enhanced to 0.85. In the present specification, an optical disc and a magneto-optical disc which use the violet laser light source are generically called "high density disc" hereafter. In the case of some high density optical discs using the objective lens having NA 0.85, a protective layer is designed to be thinner than that in DVD (0.1 mm for 0.6 mm in DVD) to reduce an amount of comatic aberration caused by skewing, having the same numerical aperture (NA) as in DVD (digital versatile disc) is used.

(Patent Document 1) Japanese Patent Publication TOKKAIHEI No. 10-123410, (Patent Document 2) Japanese Patent Publication TOKKAI No. 2001-236680.

First of all, as the first problem, there is a demand for downsizing of an optical pickup apparatus capable of conducting recording and/or reproducing of information for a high density optical disc, in the case of a use, for example, for a notebook computer. In this case, it is preferable to use an objective lens having a small diameter for downsizing of the optical pickup apparatus. On the other hand, an objective lens complying with high NA for high density recording and/or reproducing is disclosed in Patent Document 1, and this objective lens has two combined lenses each having positive paraxial power, and therefore, a height of a point for light to pass through on an optical surface on the optical disc side grows lower, thus, the working distance of the high NA objective lens which tends to be small originally becomes smaller, which is unsuitable for an objective lens having a small diameter.

Next, the second problem will be explained. In general, ability to conduct recording and/or reproducing of information properly for high density optical discs is not enough as a value of an optical disc player and/or recorder product. Presently, when considering the reality that DVD and CD (compact disc) on which various types of information are recorded are on the market, mere ability to conduct recording and/or reproducing of information for high density optical discs is not enough, and ability to conduct equally recording and/or reproducing of information properly also for DVD and CD owned by a user enhances a commercial value as an optical disc player and/or recorder for high density optical disc. From the background of this kind, the optical pickup apparatus mounted on an optical disc player and/or recorder for high density optical disc is required to have capability to conduct recording and/or reproducing of information properly while keeping compatibility for any of high density optical disc and DVD, and further of CD.

As a method to conduct recording and/or reproducing of information properly while keeping compatibility for any of high density optical disc and DVD, and further of CD, there is considered a method to switch an optical system for high density optical disc and an optical system for DVD and CD, selectively depending on recording density of the optical disc for recording and/or reproducing of information. This method, however, is unsuitable for downsizing and cost increase is caused, because a plurality of optical systems are needed.

Contrary to this, if a light source unit wherein a light-emitting section for a high density optical disc, a light-emitting section for DVD and further a light-emitting section for CD are united collectively is used, a light-converging optical system can be used commonly, resulting in an advantage of downsizing of an optical pickup apparatus and cost reduction. However, when using the light source unit wherein plural light sources are united solidly, at least one light-emitting point is shifted from the optical axis of the light-converging optical system, and an image height is caused. For solving the image height, therefore, there are proposed various methods employing a prism and a diffracting element. For example, for the light source unit provided with two light-emitting sections each having a different wavelength, there is a method wherein an optical axis of a light-emitting section on one side is made to be a reference, and a light-emitting section on the other side is aligned with that reference. However, when light fluxes each having a different wavelength are emitted from the common light source unit to the coupling lens (including a collimator lens) existing in the optical path, there is a problem that a focal length fluctuates, and a magnification of the light flux entering the objective optical element fluctuates, depending on a wavelength. When light fluxes each having a different wavelength are emitted from the common light-emitting unit to the beam shaping element, there is a problem that astigmatism is caused. In this case, it is considered that the coupling lens, the beam shaping element or the light source unit itself is moved in the optical axis direction for adjustment, which, however, causes a problem of cost increase resulted from a driving mechanism provided, and of an increase of a space for installation (a tendency to grow larger). In place of the driving system of this kind, it is considered to cope with the problem by means of an optical functional surface having wavelength-selectance such as a diffractive surface, which results in a problem that a quantity of light declines because it is difficult to keep the diffraction efficiency to be high (Patent Document 2).

Further, the third problem will be explained. One of the matters that demand special attention for manufacture of an objective lens composed of single lenses having numerical aperture on the image side NA of 0.85 for conducting recording and/or reproducing of high density information is that shift error in the optical axis direction between optical surfaces (hereinafter referred to as surface shift error) causes occurrence of coma to be great. This is caused by an angle of inclination of the aspheric surface (an angle formed by the optical axis and a normal line on the aspheric surface) at the outermost area within the effective diameter on the optical surface of the objective lens on the light source side, which grows greater when the numerical aperture NA becomes high. Further, in the design of the objective lens having high NA, the problem of a working distance needs to be considered sufficiently, in addition to the surface shift error stated above. In this case, the angle of inclination of the aspheric surface is in the tendency to become gentle as the refractive index is made greater. However, if the refractive index is made greater excessively, the lens turns out to be of a meniscus form that is convex toward the light source side. Therefore, on the optical surface on the optical disc side, the peripheral area in the effective diameter is more projected toward the optical disc side than the vertex on the surface is projected, which results in a problem that the working distance is shortened. If the refractive index is further made greater, the lens becomes to be in a meniscus form, and an effect to reduce coma caused by the surface shift error is lost, although an angle of inclination of the aspheric surface is made to be more gentle. Accordingly, when designing an objective lens having high NA, it is necessary to control occurrence of coma caused by surface shift errors, and to secure the working distance sufficiently, by selecting a material having the optimum refractive index within a range to avoid a meniscus form for the lens. A condition for the optimum refractive index varies depending on design conditions such as a lens thickness on the optical axis and a magnification. However, there is no example disclosing the condition for the optimum refractive index conforming to the design conditions.

SUMMARY OF THE INVENTION

The first object of the invention is to provide an optical pickup apparatus which can conduct recording and/or reproducing of information for high density information by means of high NA and still can be made small in size, a driving apparatus for an optical information recording medium, an objective lens used for the foregoing, and a condenser lens. The second object of the invention is to provide an optical pickup apparatus capable of conducting properly recording and/or reproducing of information by using a light source unit having therein united plural light-emitting sections and an optical path compounding element. The third object of the invention is to provide an objective lens for an optical pickup apparatus, the objective lens being obtained based on the lens design in which a range of the optimum refractive index for the specific magnification and the working distance can be determined uniquely, an optical pickup apparatus and a driving apparatus for an optical information recording medium.

The objects stated above are attained by the following embodiments.

The objective lens system for the optical pickup apparatus is composed of the first lens group having negative paraxial power $P_1$ (mm$^{-1}$) arranged in order from the object side and the second lens group having positive paraxial power $P_2$ (mm$^{-1}$) for converging a light flux emitted from the first lens group on an information recording surface of the optical information recording medium.

An optical pickup apparatus that uses a light source with wavelength $\lambda 1$ to conduct reproducing and/or recording of information for the first optical information recording medium having protective layer thickness t1, a light source with wavelength $\lambda 2$ ($\lambda 1<\lambda 2$) to conduct reproducing and/or recording of information for the second optical information recording medium having protective layer thickness t2 (t1≦t2), and a light source with wavelength $\lambda 3$ ($\lambda 2<\lambda 3$) to conduct reproducing and/or recording of information for the third optical information recording medium having protective layer thickness t3 (t2≦t3), wherein there are provided a light source section in which the first light-emitting section that emits a light flux with wavelength $\lambda 1$, the second light-emitting section that emits a light flux with wavelength $\lambda 2$ and the third light-emitting section that emits a light flux with wavelength $\lambda 3$ are arranged to be close each other and are united solidly, a coupling lens that converts so that an angle of divergence of the light flux emitted from the light source section may become small, an objective optical system element that is used commonly for converging the light flux emerging from the coupling lens on any one of the first to third optical information recording media and an optical path compounding element which is arranged between the light source section and the coupling lens, and make light fluxes of at least two light sources among light sources emitted from the first to third light-emitting sections to be aligned.

BRIEF DESCRIPTION OF THE DRAWINGS.

Each of FIG. 1(a)

DETAILED DESCRIPTION OF THE INVENTION

Figure 1:
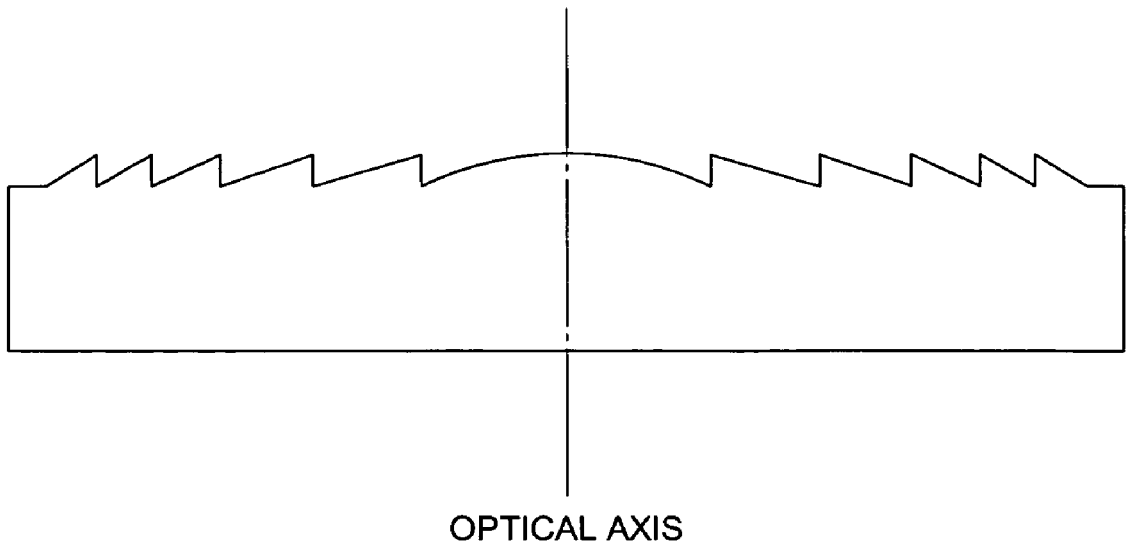
FIG. 1(b) is a diagram showing an example of a diffractive structure.
Each of FIG. 2(a)
Figure 1:
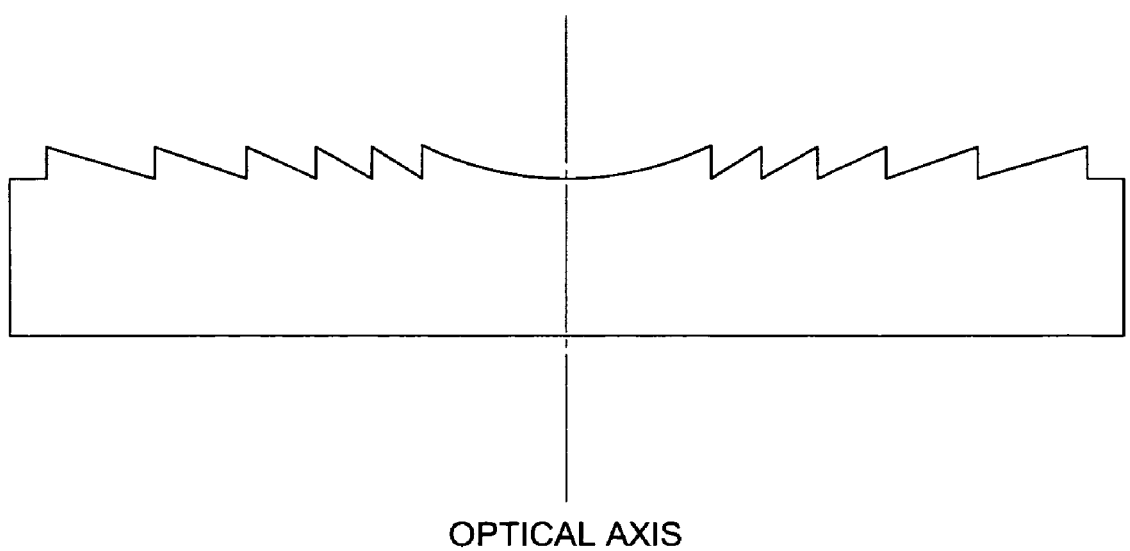

Embodiments for attaining the objects mentioned above include the following Structures (1)-(49).

Structure (1): An objective lens system for an optical pickup apparatus, the objective lens system being composed of the first lens group having negative paraxial power $P_1$ (mm$^{-1}$) arranged in order from the object side and the second lens group having positive paraxial power $P_2$ (mm$^{-1}$) for converging a light flux emitted from the first lens group on an information recording surface of the optical information recording medium.

Structure (2): The objective lens system for the optical pickup apparatus described in Structure (1), wherein the negative paraxial power $P_1$ (mm$^{-1}$) of the first lens group and the positive paraxial power $P_2$ (mm$^{-1}$) of the second lens group satisfy the following expression, $$0.02<|P_1/P_2|<0.30 \qquad (1)$$

When power distribution $|P_1/P_2|$ is greater than the lower limit of the expression (1), a sufficient working distance can be secured even when a diameter is made small, while, when it is smaller than the upper limit of the expression (1), sensitivity for manufacturing error of each lens group can be lowered and manufacturing is easy because an absolute value of paraxial power of each lens group does not become too large, and further, the optical pickup apparatus can be made compact and the objective lens can be made lighter in weight, because an effective diameter of the second lens group does not become too large. Each lens group may either be of a structure of a single lens group or be of a structure of two or more lens groups. It is preferable to satisfy the following expression to make the above-mentioned functional effects exhibited increasingly.

$$0.03<|P_1/P_2|<0.20 \qquad (1')$$

Structure (3): The objective lens system for the optical pickup apparatus according to the Structure (2), wherein high density recording can be carried out because a numerical aperture on the image side is made to be 0.8 or more, and a sufficient working distance is secured because the expression (1) is satisfied in spite of high NA.

Structure (4): The objective lens system for the optical pickup apparatus according to the Structure (2) or the Structure (3), wherein the optical pickup apparatus can be made small in size, because the following expression (2) is satisfied by diameter D (mm) of the light flux entering the objective lens system. A sufficient working distance can be secured because the expression (1) is satisfied even when a diameter of the objective lens system is small. Further, a sufficient working distance can be secured when the diameter D of the light flux is not less than the lower limit, and the optical pickup apparatus can be made small in size when the diameter D of the light flux is smaller than the upper limit of the expression (2).

$$0.7<D<3.0 \qquad (2)$$

Structure (5): The objective lens system for the optical pickup apparatus according to any one of the Structures (2)-(4), wherein the second lens group is of the structure of a single lens, which offers an advantage that the working distance can easily be secured in particular. The second lens group may be of a glass lens or of a plastic lens, further, of a hybrid lens in which a plastic aspheric surface layer is formed on an optical surface of the glass lens.

Structure (6): The objective lens system for the optical pickup apparatus according to the Structure (5),; wherein the first lens group is of the structure of a single lens.

Structure (7): The objective lens system for the optical pickup apparatus according to any one of the Structure (6), wherein a surface on the object side of the first lens group is a convex surface.

Structure (8): The objective lens system for the optical pickup apparatus according to the Structure (7), wherein the first lens group is a planoconcave lens, and a flat surface side thereof has a phase structure.

Structure (9): The objective lens system for the optical pickup apparatus according to the Structure (5), wherein focal length f (mm) of the objective lens system and on-axis thickness $d_2$ (mm) of the second lens group satisfy the following expression (3). When the second lens group is of the structure of a single group, an angle (an inclination angle of an aspheric surface) formed by a normal line on the optical surface on the first lens group side and by an optical axis can be made small when $d_2/f$ is not less than the lower limit of the expression (3), and further, edge thickness of the second lens group can be secured to make it easy to manufacture the second lens group. On the other hand, a working distance can be secured sufficiently when $d_2/f$ is not more than the upper limit of the expression (3).

$$0.7 \leq d_2/f \leq 1.4 \qquad (3)$$

Structure (10): The objective lens system for the optical pickup apparatus according to the Structure (5) or the Structure (9), wherein refractive index $N_{d2}$ of the second lens group for d line satisfies the following expression (4). When the second lens group is of the structure of a single group, an angle (an inclination angle of an aspheric surface) formed by a normal line on the optical surface on the first lens group side and by an optical axis can be made small when refractive index $N_{d2}/f$ for d line is not less than the lower limit of the expression (4), and further, edge thickness can be secured to make it easy to manufacture. Concerning a form of the aspheric surface on the periphery within an effective diameter of the optical surface on the optical disc side, an amount of protrusion toward the optical disc side from the vertex of the surface can be controlled to be small, when refractive index Nd2 for d line is not higher than the upper limit of the expression (4), thus, an effective working distance can be secured sufficiently.

$$1.60 \leq N_{d2} \leq 1.85 \qquad (4)$$

Structure (11): The objective lens system for the optical pickup apparatus according to the Structure (10), wherein the second lens group is a glass lens. Under the condition that the second lens group is a glass lens, a material having a large refractive index can be used. Reliability for light with single wavelength is high, and spherical aberration caused by temperature changes can be controlled.

Structure (12): The objective lens system for the optical pickup apparatus according to any one of the Structures (5)-(11), wherein focal length $f_2$ (mm) of the second lens group and Abbe's number $v_{d2}$ of the second lens for d line satisfy the following expression (5). When the Abbe's number $v_{d2}$ of the second lens group satisfies the following expression (5), thus, the objective lens is suitable as an objective lens system for the high density optical disc employing a violet laser light source.

$$f_2/v_{d2} \leq 0.05 \qquad (5)$$

Structure (13): The objective lens system for the optical pickup apparatus according to Structure (12), wherein Abbe's number $v_{d1}$ of the first lens group for d line and Abbe's number $v_{d2}$ of the second lens group for d line satisfy the following expression (6). In addition to the conditions of the expression (5), when Abbe's number $v_{d1}$ of the first lens group having negative paraxial power is made to satisfy the following expression (6), chromatic aberration of the second lens group can be corrected, thus, the objective lens is suitable as an objective lens system for the high density optical disc employing a violet laser light source.

$$v_{d1}<v_{d2} \qquad (6)$$

Structure (14): The objective lens system for the optical pickup apparatus according to any one of the Structures (2)-(13), wherein a magnification of the objective lens system is substantially zero. If the magnification of the objective lens system is substantially zero (a light flux entering the first lens group is a parallel light flux), an excellent tracking characteristic can be obtained and the structure of the optical pickup apparatus can be simplified. The expression of "a magnification of the objective lens system is substantially zero" means that $-0.02 \leqq m \leqq 0.02$ is satisfied when m represents the magnification.

Structure (15): The objective lens system for the optical pickup apparatus according to the Structure (14), wherein, the magnification $m_2$ of the second lens group in which spherical aberration correction is optimized, satisfies the following expression (7). When spherical aberration of the second lens group is corrected at the magnification $m_2$ that satisfies the expression 7, a sufficient working distance of the objective lens system can be secured, and occurrence of aberration caused by the change of relative positions for the first lens group and the second lens group can be controlled. Thus, a sufficient working distance can be secured even when a diameter is made small when the magnification $m_2$ is not less than the lower limit of the expression (7), and sensitivity for manufacturing error can be reduced, resulting in an advantage of easy manufacturing because paraxial power of the second lens group does not become too large when the magnification is not higher than the upper limit of the expression (7).

$$-0.15 \leqq m_2 \leqq -0.03 \tag{7}$$

The expression "for the second lens group, spherical aberration correction is optimized at the magnification $m_2$ that satisfies the expression (7) means that the magnification for which the spherical aberration is minimum is within a range of the expression (7), when spherical aberration of the light-convergent spot is measured by changing the magnification of the second lens.

Incidentally, when the objective lens system of the invention is used under the condition that a parallel flat plate is inserted on the image side in the optical pickup apparatus (namely, when the objective lens system of the invention is designed so that the parallel flat plate may cancel the spherical aberration generated), the spherical aberration of the second lens group is assumed to be measured under the condition that the parallel flat plate is inserted on the image side.

Structure (16): The objective lens system for the optical pickup apparatus according to any one of the Structures (2)-(15), wherein, the objective lens system has a phase structure of a diffractive structure or an optical path difference providing structure, and it is possible to converge each of plural light fluxes each having a different wavelength on an information recording surface of each of plural optical information recording media each having different recording density. Recording and reproducing of information can be conducted for optical discs in a multiple-standard each having a different wavelength for recording and reproducing, by forming the phase structure on any one of optical surfaces.

It is possible to provide an objective lens system which is capable of conducting, by utilizing spherical aberration correcting actions of a phase structure, recording and reproducing compatibly for optical discs in a multiple-standard each having a different wavelength for recording and reproducing, and of securing a sufficient working distance even when a diameter is made small.

Figure 2:
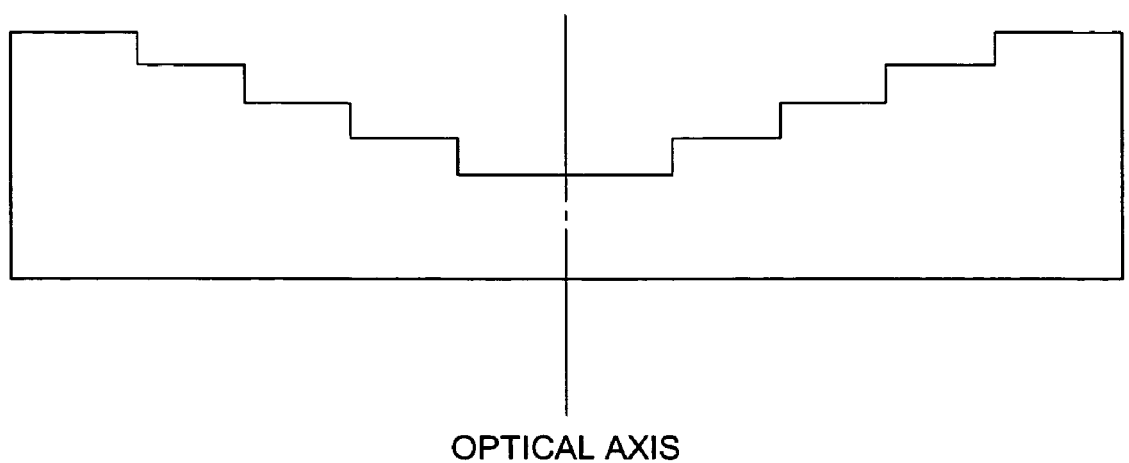
FIG. 2(b) is a diagram showing an example of a diffractive structure.
Each of FIG. 3(a)
Figure 2:
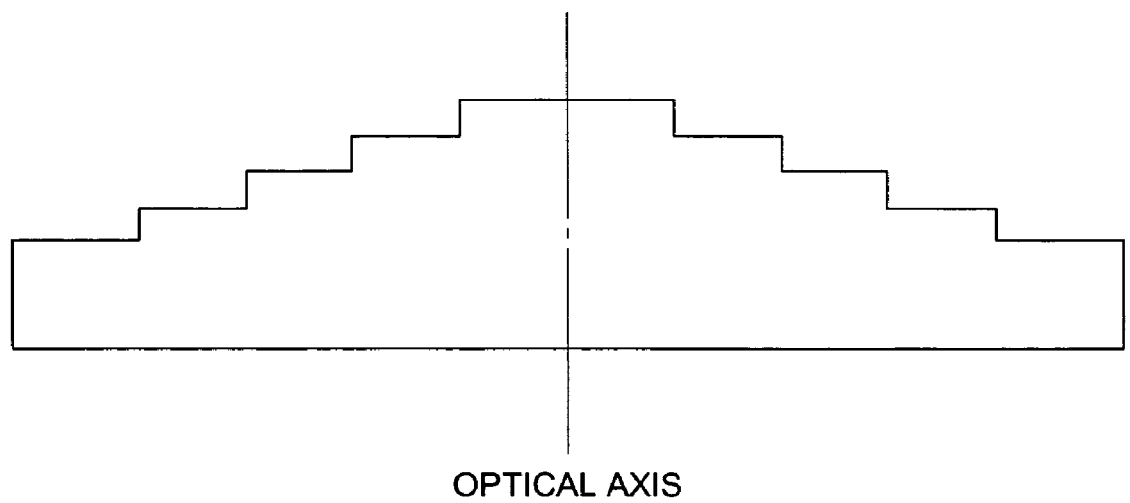
Figure 3:
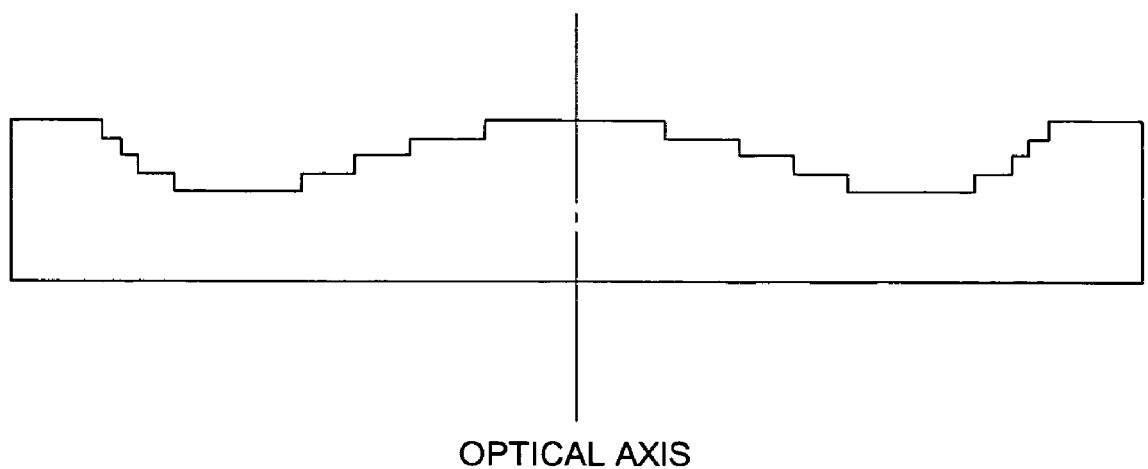
FIG. 3(b) is a diagram showing an example of a diffractive structure.
Each of FIG. 4(a)
Figure 3:
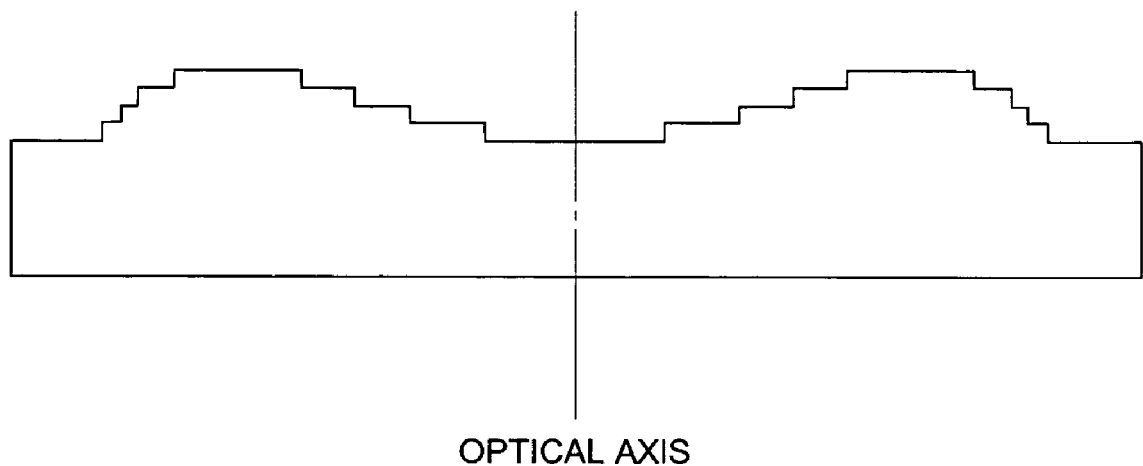

It is preferable that the phase structure is a diffractive structure or an optical path difference providing structure (which is called also as a phase difference providing structure), and a typical diffractive structure is a diffractive structure that is shown schematically in FIG. 1 and has a cross section which is serrated. This diffractive structure is one provided with fine steps representing ring-shaped zones in a form of concentric circles each having its center on the optical axis, and a prescribed optical path difference is given to light fluxes having passed through the adjoining ring-shaped zones. In this diffractive structure, when a pitch (diffracting power) and a depth (manufacture wavelength (which is called also as a blazed wavelength)) of the serrations are established, a light flux emitted from a light source within specific NA is formed to be a light-convergent spot by $8^{th}$ order diffracted light, for a certain optical disc, for example, and a light flux emitted from a light source within the same NA is formed to be a light-convergent spot by $5^{th}$ order diffracted light, for another optical disc. Concerning a light flux coming from its outside area (area of NA that is higher than the above-mentioned specific NA), however, it contributes to formation of a light-convergent spot, in the case of a high density optical disc, while, it becomes a flare, in the case of DVD, for example, and does not contribute to formation of a light-convergent spot. Incidentally, the diffractive structure may be a structure wherein a form of a cross section shown schematically in FIG. 1 is in a serrated form, or, a structure wherein a form of a cross section shown schematically in FIG. 2 or FIG. 3 is in a form of stairs, or, a structure (which is called also as a wavelength selection diffractive structure or a multi-level structure) wherein each ring-shaped zone is further divided in a form of stairs as shown schematically in FIG. 4 or FIG. 5. Further, a typical one of the optical path difference providing structure is a structure wherein a form of a cross section shown schematically in FIG. 3 is in a form of stairs.

Incidentally, each of the structures shown schematically in FIG. 1-FIG. 5 is an occasion showing the case where each structure is formed on a plane, and each structure may be formed on a spherical surface or on an aspheric surface. In diffractive structures shown schematically in FIG. 4 and FIG. 5, the number of division of ring-shaped zones is not limited to five in FIG. 4 and two in FIG. 5.

By using light with a different diffraction order, in particular, as stated above, it is possible to enhance diffraction efficiency in each case, and to secure a quantity of light. The diffractive structure of this kind is an example of the phase structure, and in addition to this, "phase difference providing structure (optical path difference providing structure)" and "wavelength selection diffractive structure (which is called also as multi-level structure" which are both known may also be used. With respect to the phase difference providing structure, TOKKAIHEI Nos. 11-2759 and 11-16190, for example, disclose examples of the ring-shaped phase correction objective lens system wherein the phase difference providing structure is formed on the surface of the objective lens.

What is described in TOKKAIHEI No. 11-2759 is an occasion wherein the basic surface form of the objective lens is established to be optimum in recording and reproducing for DVD, and correction is made by the phase difference providing structure for recording and reproducing for CD. In other words, what is described in TOKKAIHEI No. 11-2759 is one wherein steps in a form of ring-shaped zones are formed on the surface of the objective lens that is designed so that wavefront aberration may be minimum in a DVD system, and wavefront aberration in a CD system is reduced while controlling an increase of wavefront aberration in the DVD system.

In the technology stated above, the phase difference providing structure does not change phase distribution substantially for DVD wavelength. Therefore, RMS (Root Mean Square) wavefront aberration maintains a value of the objective lens that is designed to be optimum for DVD system, and acts to reduce RMS wavefront aberration of CD system, which is effective for the DVD system in which recording and reproducing abilities are sensitive to wavefront aberration.

In contract to the foregoing, TOKKAIHEI No. 10-334504 discloses an occasion where fundamental optical performances of the objective lens are established to be optimum for recording and reproducing for CD, and correction is made by the phase difference providing structure for recording and reproducing for DVD.

In the technologies above, RMS wavefront aberration for recording and reproducing for DVD and that for recording and reproducing for CD are both improved.

In the case of a ring-shaped zonal phase correction objective lens, TOKKAIHEI No. 11-16190, for example, discloses an occasion where an optical disc having a protective layer thickness that is midway between CD and DVD in term of thickness is assumed, and a basic surface form of the objective lens is established to be optimum for recording and reproducing for the aforementioned optical disc, and further, RMS wavefront aberration is corrected by the phase difference providing structure for both DVD and CD.

Further, in TOKKAI No. 2001-51192, there is disclosed a technology wherein RMS wavefront aberration is made small by changing an amount of step and a form of the surface of each ring-shaped zone, and thereby, a light-convergent position of a ray of light is made to be a point.

Further, "the wavelength selection diffractive structure (which is called also a multi-level structure)" means a form wherein a shape of stairs having prescribed number of steps is repeated periodically, and thereby, it is called also a superposition type structure. The number of steps, a height of the step and a width (pitch) of the stairs can be established properly, and an example is disclosed in TOKKAIHEI No. 9-54973. Owing to the stairs-shaped structure of this kind, it is possible to generate diffracting actions for a certain wavelength selectively among a plurality of wavelengths. For other wavelengths, the stairs-shaped structure does not diffract, and is plain to generate no optical actions.

In this case, the phase structure is employed for the purpose of correcting spherical aberration caused by a difference of a protective layer thickness in optical disc standards. However, in addition to the foregoing, the phase structure can also be used naturally for correcting aberration caused by a change in refractive index resulted from temperature changes, and for correcting aberration caused by a difference of working wavelength or by a fluctuation (mode-hop) of the working wavelength. In the occasion of aberration caused by the wavelength difference, in particular, in the case of the former, spherical chromatic aberration caused by the wavelength difference of 50 nm or more is corrected, while, in the case of the latter, a microscopic wavelength fluctuation within 5 nm is corrected.

Further, it is most preferable that the structure of this kind is used for an optical element having a refracting interface or an aspheric surface.

Structure (17): The objective lens system for the optical pickup apparatus according to the Structure (16), wherein each of plural optical information recording media has a protective layer that is thinner when recording density is higher. For example, a protective layer thickness is thinner when recording density is higher as in the case where the protective layer thickness is 1.2 mm, 0.6 mm and 0.1 mm respectively for CD, DVD and BD (Blue-ray disc), and therefore, a working distance for the conventional optical information recording media turns out to be a problem in the objective lens having compatibility for high density optical disc (BD) and conventional optical discs (DVD and CD). However, a sufficient working distance can be secured even for the conventional optical information recording medium having a thick protective layer, because the structure of the Structure (2) is owned.

Structure (18): The objective lens system for the optical pickup apparatus according to the Structure (16) or the Structure (17), wherein the first lens group has the phase structure. A decline of transmittance by vignetting of a ray of light caused by a step portion of the phase structure can be prevented by forming the phase structure on the first lens group whose absolute value of paraxial power is small.

Structure (19): The objective lens system for the optical pickup apparatus according to any one of the Structures (16)-(18), wherein the wavelengths of the plural light fluxes include the first wavelength within a range from 380-420 nm and the second wavelength within a range from 630-680 nm. Recording and reproducing of information can be conducted for high density optical discs using a violet laser light source and for DVD, in the invention.

Structure (20): The objective lens system for the optical pickup apparatus according to any one of the Structures (16)-(18), wherein the wavelengths of the plural light fluxes include the first wavelength within a range from 380-420 nm, the second wavelength within a range from 630-680 nm, and the third wavelength within a range from 740-840 nm. Thus, recording and reproducing of information can be conducted for high density optical discs using a violet laser light source, DVD and further for CD, in the invention.

Structure (21): The objective lens system for the optical pickup apparatus according to any one of the Structures (2)-(20), wherein excellent tracking characteristics can be obtained because the first lens group and the second lens group are held so that their relative positions may be unchangeable. A flange portion of the first lens group and that of the second lens group may be united through fitting or adhesion so that the first lens group and the second lens group are integrated solidly, or the both flange portions may be united through a holding member representing a separate member.

Structure (22): An optical pickup-apparatus having therein a light source, an objective lens system described in any one of the Structures (2)-(21) and a light-receiving system that receives light reflected on an information recording surface of an optical information recording medium, wherein recording and reproducing of information are conducted by converging a light flux emitted from the light source on an information recording surface of the optical information recording medium through the objective lens system.

Structure (23): A driving apparatus for an optical information recording medium in which the optical pickup apparatus described in-the Structure (22) is housed, wherein recording and reproducing of information are conducted by the optical pickup apparatus which can move freely in the radial direction of the optical information recording medium for the rotating optical information recording medium.

Structure (24): A condenser lens used in an objective lens system for an optical pickup apparatus, which is constituted by one lens group and has a function to converge an incident light flux representing divergent light onto an information recording surface of an optical information recording medium, wherein a numerical aperture on the image side is 0.8 or more, and effective diameter $D_c$ (mm) on a plane of incidence, focal length $f_c$ (mm) and on-axis thickness $d_c$ (mm) satisfy the following expressions (8) and (9), which contributes to downsizing of an optical pickup apparatus. Thus, a sufficient working distance can be secured when effective diameter DC on a plane of incidence is not less than the lower limit of the expression (8). The optical pickup apparatus can be made compact when effective diameter DC is smaller than the upper limit of the expression (8), and further, an angle (an angle of inclination of an aspheric surface) formed by a normal line on the optical surface on the light source side and the optical axis can be made small, when the on-axis thickness is not less than the lower limit of the expression (9). Further, edge thickness of the condenser lens can be secured to make it easy to manufacture, while, a working distance can be secured sufficiently when the on-axis thickness is not more than the upper limit of the expression (3).

$$0.7 \leq D_c < 3.0 \tag{8}$$

$$0.7 \leq d_c/f_c \leq 1.4 \tag{9}$$

Structure (25): The condenser lens according to the Structure (24), wherein the refractive index $N_{dC}$ for d line satisfies the following expression (10).

$$1.60 \leq N_{dC} \leq 1.85 \tag{10}$$

Structure (26): The condenser lens according to the Structure (25), wherein the condenser lens is a glass lens.

Structure (27): The condenser lens according to any one of the Structures (24)-(26), wherein focal length $f_c$ (mm) and Abbe's number $v_{dC}$ for d line satisfy the following expression (11).

$$f_c/v_{dC} \leq 0.05 \tag{11}$$

Structure (28): The condenser lens according to any one of the Structures (24)-(27), wherein magnification $m_C$ satisfies the following expression (12).

$$-0.15 \leq m_C \leq -0.03 \tag{12}$$

Structure (29): An optical pickup apparatus that uses a light source with wavelength λ1 to conduct reproducing and/or recording of information for the first optical information recording medium having protective layer thickness t1, then uses a light source with wavelength λ2 (λ1<λ2) to conduct reproducing and/or recording of information for the second optical information recording medium having protective layer thickness t2 (t1≦t2), and uses a light source with wavelength λ3 (λ2<λ3) to conduct reproducing and/or recording of information for the third optical information recording medium having protective layer thickness t3 (t2≦t3), wherein there are provided a light source section in which the first light-emitting section that emits a light flux with wavelength λ1, the second light-emitting section that emits a light flux with wavelength λ2 and the third light-emitting section that emits a light flux with wavelength λ3 are arranged to be close each other and are united solidly, a coupling lens that converts so that an angle of divergence of the light flux emitted from the light source section may become small, an objective optical element that is used commonly for converging the light flux emerging from the coupling lens on any one of the first-third optical information recording media, and an optical path compounding element which is arranged between the light source section and the coupling lens, and make light fluxes of at least two light sources among light sources emitted from the first-third light-emitting sections to be aligned.

Structure (30): The optical pickup apparatus according to the Structure (29), further comprising a light-receiving element that receives light reflected on an information recording surface of each of the first-third optical information recording media and converts into electric signals.

In the Structure (30), the optical path compounding element compounds optical paths between the light source section and the coupling lens for light fluxes respectively with three different wavelengths, and therefore, compounding of optical paths can be realized only by optical actions without requiring any driving system. Thus, space saving can be achieved thereby, and it becomes easy to handle light fluxes between the optical path compounding element and the objective lens, resulting in simplification of, for example, a light-convergence optical system.

Structure (31): The optical pickup apparatus according to the Structure (30), wherein the optical path compounding element is composed of a prism provided with at least two surfaces each transmitting or reflecting selectively for at least two wavelengths, thus, compact and highly accurate optical path compounding can be realized.

Structure (32): The optical pickup apparatus-according to the Structure (30) or Structure (31), wherein the optical path compounding element is provided with a diffracting element, thus, the diffractive structure provided on the diffracting element can support compounding of optical paths and can adjust an optical path length.

Structure (33): The optical pickup apparatus according to any one of the Structures (30)-(32), wherein a light flux with the first wavelength enters the objective optical element in a form of infinite parallel light, a light flux with the second wavelength enters the objective optical element in a form of finite divergent light with the first degree of divergence, and a light flux with the third wavelength enters the objective-optical element with the second degree of divergence that is greater than the first degree of divergence. Thus, by making a light flux enter the objective optical element with different magnification for each wavelength, recording and/or reproducing of information can be conducted properly and a working distance can be secured.

Structure (34): The optical pickup apparatus according to any one of the Structures (30)-(33), wherein an optical path adjusting means that provides an optical path length which is different for each wavelength between the objective optical element and the light-receiving element. Thus, it is possible to adjust a position of focus by changing the optical path length, even when the objective optical element has a different refracting power for each wavelength.

Structure (35): The optical pickup apparatus according to any one of the Structures (30)-(34), wherein the optical path compounding element is provided with an optical path adjusting means that provides a different optical path length for each wavelength. Thus, it is possible to adjust a position of focus by changing the optical path length, even when the objective optical element has a different refracting power for each wavelength, and the optical pickup apparatus can be compact in terms of its structure.

Structure (36): The optical pickup apparatus according to the Structure (35), wherein all of light fluxes respectively with the first to third wavelengths enter the objective optical element in a form of an infinite parallel light. Thus, it is possible to obtain excellent tracking characteristics, even when a light flux with any wavelength is used.

Structure (37): The optical pickup apparatus according to the Structure (35) or Structure (36), wherein the optical path compounding element corrects fluctuations of a focal length caused by wavelength difference in the first to third wavelengths, in the coupling lens. Thus, the position of the focus can be adjusted by the coupling lens, even when the objective optical element has different refracting power for each wavelength.

Structure (38): The optical pickup apparatus according to any one of the Structures (35)-(37), wherein the optical path compounding element is provided with a beam shaping optical element between the optical path compounding element and the coupling lens, and in the beam shaping optical element, astigmatism caused by a wavelength difference in the first to third wavelengths. Thereby, the astigmatism can be corrected properly.

Structure (39): An optical path compounding element represented by one which is used in the optical pickup apparatus according to the Structures (30)-(37) and is arranged between the light source section and the coupling lens to align optical axes of light fluxes emitted from the first to third light-emitting sections.

Structure (40): An optical pickup apparatus represented by one conducting reproducing and/or recording of information for the first optical information recording medium having protective layer thickness t1 by using a light source with wavelength λ1, conducting reproducing and/or recording of information for the first optical information recording medium having protective layer thickness t2 (t1≦t2) by using a light source with wavelength λ2 (λ1<λ2), and conducting reproducing and/or recording of information for the third optical information recording medium having protective layer thickness t3 (t2<t3) by using a light source with wavelength λ3 (λ2<λ3), wherein there are provided a light source section in which the first light-emitting section emitting a light flux with wavelength λ1, the second light-emitting section emitting a light flux with wavelength λ2 and the third light-emitting section emitting a light flux with wavelength λ3 are arranged to be close each other and united solidly, a coupling lens that transmits a light flux emitted from the light source section, an objective optical element used commonly to converge a light flux emerging from the coupling lens on an optical information recording medium, a light-receiving element used commonly to receive light reflected on an information recording surface of each of the first-third optical information recording media, and to convert into an electric signal and an optical path compounding element which is provided with an optical surface having two optical path difference providing functions each having a different diffracting action, and is arranged between the light source section and the coupling lens, or between the coupling lens and the objective optical element, to align optical axes of light fluxes emitted from the first-third light-emitting sections.

In the Structure (40), the optical path compounding element compounds optical paths between the light source section and the coupling lens, or between the coupling lens and the objective optical element, for three different wavelengths, and therefore, optical path compounding can be realized only by optical actions without requiring any driving system. Thereby, space saving can be achieved, and handling of light fluxes between the optical path compounding element and the objective lens becomes-easy, thus, the light-convergent optical system, for example, can be simplified.

Structure (41): An optical pickup apparatus represented by one conducting reproducing and/or recording of information for the first optical information recording medium having protective layer thickness t1 by using a light source with wavelength λ1, conducting reproducing and/or recording of information for the first optical information recording medium having protective layer thickness t2 (t1≦t2) by using a light source with wavelength λ2 (λ1<λ2), and conducting reproducing and/or recording of information for the third optical information recording medium having protective layer thickness t3 (t2<t3) by using a light source with wavelength λ3 (λ2<λ3), wherein there are provided a light source section in which the first light-emitting section emitting a light flux with wavelength λ1, the second light-emitting section emitting a light flux with wavelength λ2 and the third light-emitting section emitting a light flux with wavelength λ3 are arranged to be close each other and united solidly, a coupling lens that transmits a light flux emitted from the light source section, an objective optical element used commonly to converge a light flux emerging from the coupling lens on an optical information recording medium, a light-receiving element used commonly to receive light reflected on an information recording surface of each of the first-third optical information recording media, and to convert into an electric signal and an optical path compounding element which is provided with an optical surface having two optical path difference providing functions each having a different diffracting action, and is arranged between the objective optical element and the light-receiving element to align optical axes of light fluxes emitted from the first-third light-emitting sections.

In the Structure (41), the optical path compounding element compounds optical paths between the objective optical element and the light-receiving element for light fluxes with three different wavelengths, and therefore, optical path compounding can be realized only by optical actions without requiring any driving system, and thereby, space saving can be achieved, and handling of light fluxes between the optical path compounding element and the objective lens becomes easy.

Structure (42): An optical-pickup apparatus provided with at least two light sources including the first light source emitting a wavelength within a range from 380 nm to 420 nm and the second light source emitting the wavelength different from those mentioned above, and with a collimator lens, wherein an optical path length is adjusted so that infinite parallel light may be emitted from the collimator lens for at least two light fluxes including the light fluxes emitted respectively from the first light source and the second light source.

Structure (43): An objective lens of the optical pickup apparatus having a single lens structure, wherein a numerical aperture on the image side is made to be greater than 0.83, and the following expressions (13)-(15) are satisfied when D (mm) represents the maximum effective diameter of the optical surface on the light source side, fB (mm) represents a distance from the vertex of the optical surface on the optical disc side to the surface of the optical disc, m represents the magnification, and $N_{405}$ represents the refractive index for wavelength 405 nm, and any one of the following conditions (I)-(VI) is satisfied.

$$-0.15 < m < 0.015 \tag{13}$$

$$0.10 \leqq fB/D < 0.28 \tag{14}$$

$$1.55 < N_{405} < 1.90 \tag{15}$$

(I) $-0.05 < m < 0.015$, $0.10 \leqq fB/D < 0.15$, and $1.65 < N_{405} < 1.85$;
(II) $-0.05 < m < 0.015$, $0.15 \leqq fB/D < 0.20$, and $1.60 < N_{405} < 1.80$;
(III) $-0.05 < m < 0.015$, $0.20 \leqq fB/D \leqq 0.25$, and $1.55 < N_{405} < 1.75$;
(IV) $-0.15 < m \leqq -0.05$, $0.13 \leqq fB/D < 0.18$, and $1.70 < N_{405} < 1.90$;
(V) $-0.15 < m \leqq -0.05$, $0.18 \leqq fB/D < 0.23$, and $1.65 < N_{405} < 1.85$; and
(VI) $-0.15 < m \leqq -0.05$, $0.23 \leqq fB/D \leqq 0.28$, and $1.60 < N_{405} < 1.80$.

Since the objective lens relating to the Structure (43) satisfies expressions (13)-(15), if one of the conditions (I)-(VI) is made to be satisfied, it is possible to obtain an easily-manufactured objective lens wherein occurrence of coma resulting from surface shift errors is controlled within a range avoiding a meniscus form, and a sufficient working distance can be secured.

Incidentally, in the objective lens relating to the Structure (43), it is preferable that the following conditional expression concerning a form is satisfied;

$$0.45<(SAG_1-SAG_2)\times(N_{405}-1)/\{NA\cdot f(1+|m|)^{1/2}\}<0.68.$$

Here, $SAG_1$ represents a distance (mm) in the optical axis direction from a plane that is tangent to the optical surface on the light source side at its vertex and is perpendicular to the optical axis to the optical surface on the light source side at the position of the maximum effective diameter, and the distance is positive when it is measured toward the optical disc with the aforementioned tangential plane serving as a reference, and it is negative when it is measured toward the light source. $SAG_2$ represents a distance (mm) in the optical axis direction from a plane that is tangent to the optical surface on the optical disc side at its vertex and is perpendicular to the optical axis to the optical surface on the light source side at the position of the maximum effective diameter, and the distance is positive when it is measured toward the optical disc with the aforementioned tangential plane serving as a reference, and it is negative when it is measured toward the light source. $N_{405}$ represents the refractive index for wavelength 405 nm, NA represents a numerical aperture on the image side, F represents a focal length (mm) and m represents a magnification.

Structure (44): The objective lens of the optical pickup apparatus according to the Structure (43), wherein the objective lens is a glass lens. Thereby, a material having a large refractive index for d line can be used, and an objective lens that is highly reliable for light of single wavelength and has small spherical aberration change caused by temperature changes and has a high NA can be provided.

Structure (45): The objective lens of the optical pickup apparatus according to the Structure (43) or the Structure (44), wherein focal length f (mm) and lens thickness on the optical axis d (mm) satisfy the following expression (16);

$$0.7 \leq d/f \leq 1.4 \quad (16)$$

When d/f is 0.7 or more, an angle (an inclination angle of an aspheric surface) formed by a normal line on the optical surface on the light source side and by an optical axis can be made small, and further, edge thickness can be secured to make it easy to manufacture the objective lens, while, when d/f is not more than the upper limit of the expression (16), the working distance can be secured sufficiently.

Structure (46): The objective lens of the optical pickup apparatus according to any one of Structures (43)-(45), wherein the objective lens is one to be used in the optical pickup apparatus employing the light source with a wavelength within a range of 390-420 nm, and focal length f (mm) and Abbe's number $v_d$ for d line satisfy the following expression (17);

$$f \cdot v_d \leq 0.05 \quad (17)$$

When Abbe's number $v_d$ satisfies the expression (17), chromatic aberration of the objective lens can be controlled to be small, and therefore, the objective lens is suitable for the high density optical disc employing a violet laser light source.

Structure (47): The objective lens of the optical pickup apparatus according to the Structure (44), wherein specific gravity ρ satisfies the following expression (18), and thereby an objective lens that is light in weight in spite of glass can be provided.

$$2.3 < \rho < 4.7 \quad (18)$$

Structure (48): An optical pickup apparatus having therein a light source, an objective lens that is described in any one of the Structures (43)-(47) and converges a light flux emitted from the light source on an information recording surface of an optical information recording medium, and a light-receiving system that receives a reflected light coming from the information recording surface of the optical information recording medium.

Structure (49): A driving apparatus for an optical information recording medium wherein recording and/or reproducing of information is conducted for the rotating optical information recording medium by the optical pickup apparatus that is described in the Structure (48) and is made to be capable of moving freely in the radial direction of the optical information recording medium.

In the present specification, optical discs (which are also called optical information recording media) employing a violet semiconductor laser and a violet SHG laser as a light source for conducting recording and reproducing of information are generically called "high density discs", and in addition to the optical discs (for example, BD: Blu-ray discs) in the standard to conduct recording and reproducing of information with an objective optical system with NA 0.85 and to have a protective layer thickness of about 0.1 mm, optical discs (for example, HD DVD) in the standard to conduct recording and reproducing of information with an objective optical system with NA 0.65-0.67 and to have a protective layer thickness of about 0.6 mm are also included. Further, in addition to the optical discs having the protective layer of this kind on an information recording surface, an optical disc having, on its information recording surface, a protective film whose thickness is about several—several tens nm and an optical disc whose protective layer or a protective film is zero in thickness. Further, in the present specification, it is assumed that a magneto-optical disc employing a violet semiconductor laser or a violet SHG laser as a light source for conducting recording and reproducing of information is also included in a high density optical disc.

Further, in the present specification, DVD is a general term for optical discs in DVD series such as DVD-ROM, DVD-Video, DVD-Audio, DVD-RAM, DVD-R, DVD-RW, DVD+R and DVD+RW, while, CD is a general term for optical discs in CD series such as CD-ROM, CD-Audio, CD-Video, CD-R and CD-RW. With respect to recording density, a high density optical disc is highest, DVD is lower than the high density optical disc and CD is lower than DVD.

Further, in the present specification, "an objective optical system (which is called also an objective optical element or an objective lens system)" means an optical system including at least a light-convergent element which is arranged at the position facing an optical information recording medium (which is called also an optical disc) on the optical pickup apparatus, and has a function to converge light fluxes each having a different wavelength emitted respectively from light sources on information recording surfaces of optical discs each having different recording density.

Further, when there is an optical element that is united with the light-convergent element to be driven by an actuator to perform tracking and focusing, the optical system composed of the optical element and the light-convergent element serves as the objective optical system. When the objective optical system is composed of plural optical elements as stated above, it is preferable to form a phase structure on an optical surface of the optical element other than the light-convergent element, for reducing an effect of vignetting of a light flux caused by a step portion of the phase structure, although a phase structure may be formed on an optical surface of the light-convergent element. "The optical element" includes a lens and a phase plate (phase plate in a form of a parallel flat plate). Further, "the lens" includes not only a single lens but also a cemented lens.

Further, in the present specification, when lenses each having positive paraxial power are arranged continuously in succession, starting with the lens that has positive paraxial power and is arranged to be closest to the optical information recording medium (closest to the image), these lenses are collectively made to be the second lens group. Therefore, the first lens group in the objective lens system is one including all optical elements in the objective lens system arranged to be closer than the second lens group to the light source side (object side). Incidentally, there can be some occasions where the second lens group is composed of lenses each being arranged to be closest to the optical information recording medium side (closest to the image side) and having positive paraxial power. Further, when observing optical elements successively from the one closest to the optical information recording medium side (closest to the image side), the optical element which appears first to be zero in terms of its paraxial power, other than the lens having negative paraxial power, and all optical elements arranged to be closer than the aforementioned optical element to the light source side (the object side) constitute the first lens group.

The invention makes it possible to provide an optical pickup apparatus which is capable of conducting recording and/or reproducing of at least high density information and yet is compact in structure.

DETAILED DESCRIPTION OF THE PREFERRED EMBODIMENT

Preferred embodiment for practicing the invention will be explained as follows, referring to the drawings. Incidentally, an apparatus that is provided with an optical pickup apparatus and conducts recording and/or reproducing of information by moving the optical pickup apparatus and the rotating optical information recording medium relatively, is called a driving apparatus for an optical information recording medium.

First Embodiment

Figure 6:
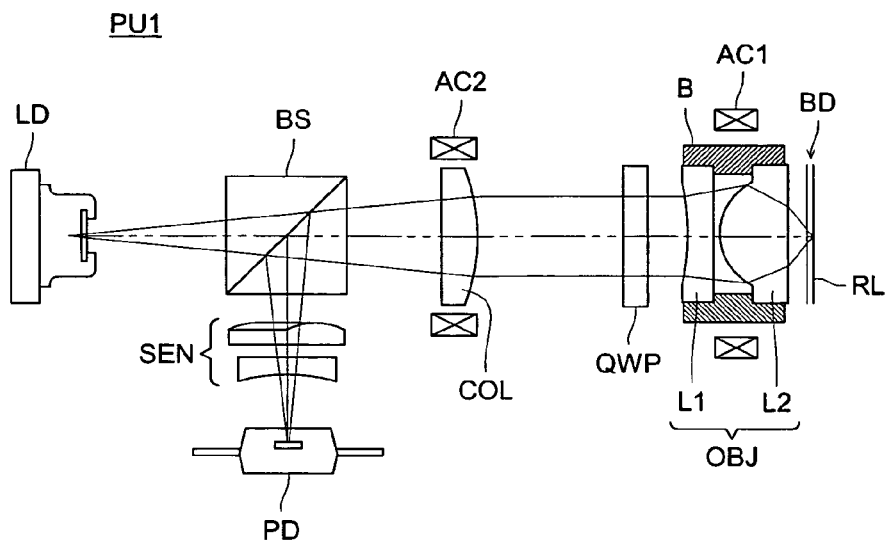
FIG. 6 is a diagram showing schematically the structure of the first optical pickup apparatus PU1.

FIG. 6 is a diagram showing schematically the structure of first optical pickup apparatus PU1 capable of conducting recording and reproducing of information for high density disc BD (optical disc). Optical specifications of the high density optical disc BD include wavelength $\lambda 1=408$ nm, protective layer PL1 thickness $t1=0.1$ mm and numerical aperture $NA1=0.85$.

The optical pickup apparatus PU1 has therein semiconductor laser LD, beam splitter BS, collimator lens COL, ¼ wavelength plate QWP, objective lens system OBJ, sensor lens SEN and photodetector (which is called also a light-receiving system or a light-receiving element) PD.

When conducting recording and reproducing of information for high density optical disc BD, in the optical pickup apparatus PU1, semiconductor laser LD is driven to emit light. A divergent light flux emitted from the semiconductor laser LD is transmitted through beam splitter BS, then, is transmitted through ¼ wavelength plate QWP after being made to be a parallel light flux, and becomes a spot formed by objective lens system OBJ on information recording surface RL of high density optical disc OD through a protective base board. The objective lens system OBJ is driven by biaxial actuator AC1 arranged on its periphery for focusing and tracking. A reflected light flux modulated by information pits on information recording surface RL is transmitted again through objective lens system OBJ and ¼ wavelength plate QWP, then, is made to be a converged light flux by collimator lens COL, to be reflected by beam splitter BS, and is received by photodetector PD after being transmitted through sensor lens SEN. By using the output signal of the photodetector PD, information recorded on high density optical disc BD can be read. Incidentally, the collimator lens COL is movable in the optical axis direction to correct spherical aberration when conducting recording and reproducing of information for high density optical disc BD.

Next, objective lens system OBJ will be explained. The objective lens system OBJ has a structure wherein first lens group L1 that is arranged on the object side and has negative paraxial power P1 (mm-1) and second lens group (which is called also a condenser lens) L2 which represents condenser lens group for converging a light flux emitted from the first lens group L1 on information recording surface RL of optical disc BD, and has positive paraxial power P2 (mm-1) are solidly connected by holder B, and the following expression (1) is satisfied.

$$0.02<|P_1/P_2|<0.30 \quad (1)$$

Incidentally, a diffractive structure whose cross section form is serrated as shown in FIG. 1 is formed on an optical surface of the first lens group on the light source side. This diffractive structure is a structure for correcting chromatic aberration on a violet area.

EXAMPLE 1

Figure 8:
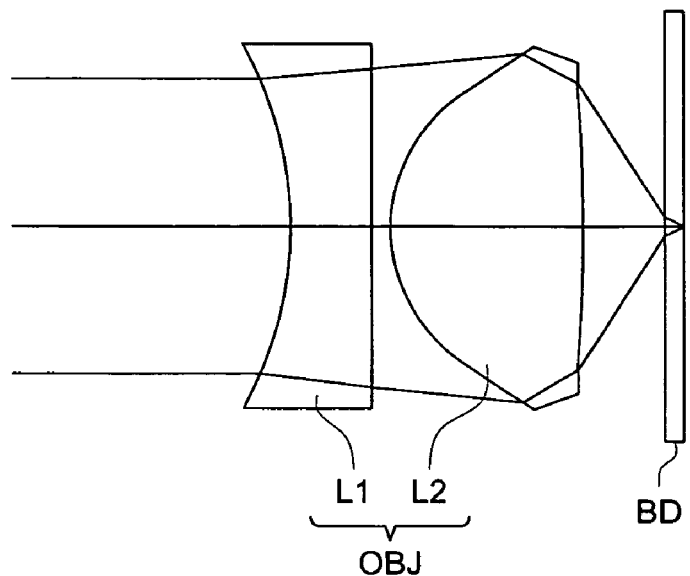
FIG. 8 is a sectional view of an objective lens OBJ in Example 1.

An objective lens suitable for the first optical pickup apparatus PU1 will be explained. FIG. 8 shows a diagram of an optical path for the objective lens system in Example 1. Its lens data are shown in Table 1. Incidentally, let it be assumed that an exponentiation of 10 (for example, 2.5×10-3) is expressed by E (for example, 2.5 E-3) hereafter (including lens data in the table).

TABLE 1

(Example 1)

(Paraxial data)

| Surface No. | r(mm) | d(mm) | $N_\lambda$ | $N_d$ | $v_d$ | Remarks |
|---|---|---|---|---|---|---|
| OBJ | | ∞ | | | | Light-emitting point |
| STO | | 0.5000 | | | | Diaphragm |
| 1 | −3.6703 | 0.5000 | 1.5242 | 1.5091 | 56.5 | Objective |
| 2 | ∞ | 0.1000 | | | | lens |
| 3 | 0.8556 | 1.1800 | 1.7149 | 1.6935 | 53.2 | system |
| 4 | −3.5123 | 0.5002 | | | | |
| 5 | ∞ | 0.1000 | 1.6211 | 1.5855 | 30.0 | Protective |
| 6 | ∞ | | | | | layer |

(Aspheric surface coefficient)

| | First surface | Third surface | Fourth surface |
|---|---|---|---|
| κ | 0.19143E+01 | −0.67063E+00 | −0.15056E+03 |
| A4 | −0.72037E−02 | 0.34684E−01 | 0.16721E+00 |
| A6 | −0.15261E−01 | −0.27202E−01 | −0.12294E+00 |
| A8 | −0.18790E−01 | 0.92531E−01 | −0.41593E−01 |
| A10 | −0.22152E−02 | −0.69198E−01 | −0.16894E−01 |
| A12 | 0.00000E+00 | −0.17490E−01 | 0.10680E+00 |
| A14 | 0.00000E+00 | 0.57572E−01 | −0.73489E−01 |

TABLE 1-continued (Example 1)

| | | | |
|---|---|---|---|
| A16 | 0.00000E+00 | −0.34337E−02 | 0.11552E−01 |
| A18 | 0.00000E+00 | −0.14427E−01 | 0.00000E+00 |
| A20 | 0.00000E+00 | −0.79780E−02 | 0.00000E+00 |

(Optical path difference function coefficient)

First surface

| | |
|---|---|
| n | 1 |
| λB | 408 nm |
| B2 | −0.30000E−01 |
| B4 | −0.68603E−02 |
| B6 | −0.98756E−02 |
| B8 | −0.80827E−02 |
| B10 | −0.18672E−02 |

Incidentally, an aspheric surface in each example is prescribed by a numerical expression wherein coefficients shown in Table 1 are respectively substituted in the expression of Numeral 1;

$$X(h^2/r)/\{1+[1-(1+\kappa)(h/r)^2]^{1/2}\}+A_2h^2A_4h^4+A_6h^6+ \quad \text{(Numeral 1)}$$

wherein, X represents an axis in the optical axis direction (the direction of travel of light is given the +sign), κ represents the conic constant, A2i represents an aspheric surface coefficient and h represents a height from the optical axis.

Further, with respect to a diffractive structure of each example, an optical path length given by the diffractive structure to a light flux with each wavelength is prescribed by a numerical expression wherein coefficients shown in Table 1 are respectively substituted for the optical path difference function in the expression of Numeral 2;

$$\phi_b=(\lambda/\lambda_B)\times n \times (B_2h^2+B_4h^4+B_6h^6+\ldots) \quad \text{(Numeral 2)}$$

wherein, λ represents a wavelength of an incident light flux, $\lambda_B$ represents a manufacturing wavelength of the diffractive structure, n represents an order number of diffracted light having the maximum diffraction efficiency among diffracted light generated by the diffracted structure and $B_{2i}$ represents a coefficient of the optical path difference function.

In the present example, the first lens group is a plastic lens, and the second lens group is a glass lens ("M-LAC130" made by HOYA Co. is used). They are in the design to correct paraxial chromatic aberration and spherical aberration changes caused by changes in wavelength of incidence, by the diffractive structure formed on the optical surface on the light source side (First surface in Table 1) of the first lens group. In spite of the objective lens system with a diameter that is as small as 1.914 mm in terms of incident light flux diameter D, a working distance of 0.5 mm is secured. "Specifications of the objective lens system" include wavelength λ=408 nm, numerical aperture on the image side NA=0.85, incident light flux diameter D=1.914 mm, focal length f=1.132 mm, magnification m=0 and paraxial power ratio |P₁/P₂|=0.090. "Specification of the first lens group" includes paraxial power $P_1$=−0.083 (mm⁻¹) and "Specifications of the second lens group" include focal length $f_2$=1.084 mm, magnification m=−0.094 and paraxial power $P_2$=0.923 (mm⁻¹).

Second Embodiment

Figure 7:
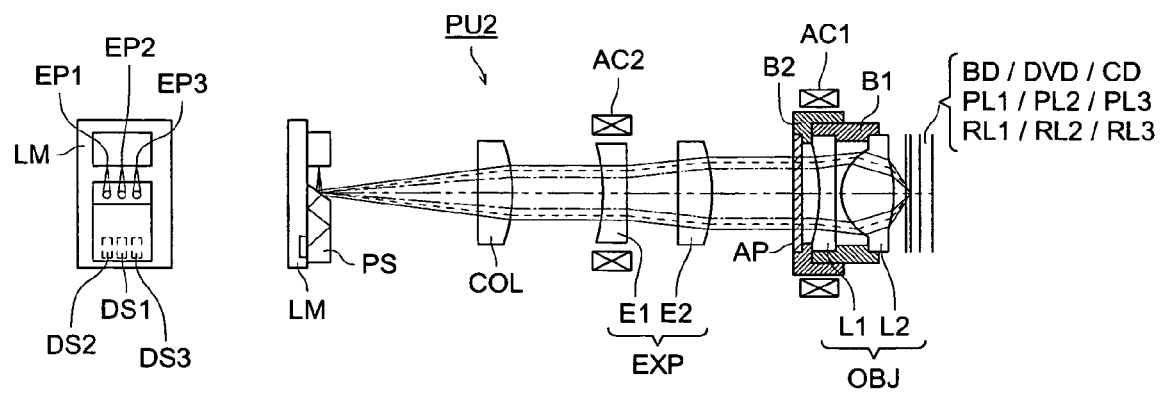
FIG. 7(a) is a diagram showing schematically the structure of the second optical pickup apparatus PU2 capable of conducting recording and/or reproducing of information properly for any of high density optical disc BD, DVD and CD.
FIG. 7(b) is a front view of a light source unit used for the second optical pickup apparatus PU2.

FIG. 7(a) is a diagram showing schematically the structure of second optical pickup apparatus PU2 capable of conducting recording and reproducing of information properly for any of high density optical disc BD, DVD and CD, and FIG. 7(b) is a front view of a light source unit used in the second optical pickup apparatus PU2. Optical specifications of the high density optical disc BD include wavelength λ1=408 nm, protective layer PL1 thickness t1=0.1 mm and numerical aperture NA1=0.85, optical specifications of DVD include wavelength λ2=658 nm, protective layer PL2 thickness t2=0.6 mm and numerical aperture NA2=0.65, and optical specifications of CD include wavelength λ3=785 nm, protective layer PL3 thickness t2=1.2 mm and numerical aperture NA3=0.45. However, a combination of the wavelength, a protective layer thickness and the numerical aperture is not limited to the foregoing.

The optical pickup apparatus PU2 has therein the first light-emitting section EP1 (first light source) that emits a laser light flux (first light flux) with wavelength of 408 nm emitted when conducting recording and reproducing of information for high density optical disc BD, the second light-emitting section EP2 (second light source) that emits a laser light flux (second light flux) with wavelength of 658 nm emitted when conducting recording and reproducing of information for DVD, the third light-emitting section EP3 (third light source) that emits a laser light flux (third light flux) with wavelength of 785 nm emitted when conducting recording and reproducing of information for CD, first light-receiving section DS1 that receives a reflected light flux coming from information recording surface RL1 of high density optical disc BD, second light-receiving section DS2 that receives a reflected light flux coming from information recording surface RL2 of DVD, third light-receiving section DS3 that receives a reflected light flux coming from information recording surface RL3 of CD, laser module LM composed of prism PS, collimator lens COL, expander optical system EXP composed of positive lens E1 and negative lens E2, aperture regulating element AP and objective lens system OBJ. Incidentally, the light-receiving system is composed of light-receiving sections DS1-DS3.

In the optical pickup apparatus PU2, when conducting recording and reproducing of information for high density optical disc BD, laser module LM is operated to drive the first light-emitting section EP1 to emit light. A divergent light flux emitted from the first light-emitting section EP1 is reflected by prism PS, as its light path is shown with solid lines in FIG. 7(a), then, it passes through collimator lens COL to be converted into a parallel light flux, then, it is enlarged in terms of a diameter of the light flux by expander optical system EXP and the diameter of the light flux is regulated by an unillustrated diaphragm, thus, it is transmitted through aperture regulating element AP to become a spot formed by objective lens system OBJ on information recording surface RL1 through the first protective layer PL1. The objective lens system OBJ is driven by biaxial actuator AC1 arranged on its periphery for focusing and tracking. A reflected light flux modulated by information pits on information recording surface RL1 is transmitted again through objective lens system OBJ, aperture regulating element AP and expander optical system EXP, then, is made to be a converged light flux by collimator lens COL, to be reflected twice in the prism PS to be converged on light-receiving section DS1. Thus, information recorded on high density optical disc BD can be read by using output signals of the light-receiving section DS.

In this case, causes for generation of spherical aberration that is corrected by position adjustment of negative lens E1 that can correct spherical aberration of a spot formed on information recording surface RL1 of high density optical disc BD, by driving the negative lens E1 in the optical axis direction by an unillustrated uniaxial actuator, include, for example, wavelength fluctuations caused by manufacturing errors of the first light source, changes and distribution of the refractive index of objective optical system OBJ caused by temperature changes, focus jump between information recording layers of high density optical disc of a multi-layer recording type such as 2-layer disc and 4-layer disc and thickness fluctuation and thickness distribution caused by manufacturing errors of protective layer PL1.

When conducting recording and reproducing of information for DVD, in the optical pickup apparatus PU2, laser module LM is operated to drive the second light-emitting section EP2 to emit light. A divergent light flux emitted from the second light-emitting section EP2 is reflected by prism PS, as its light path is shown with dotted lines in FIG. 2(a), then, it passes through collimator lens COL to be converted into a parallel light flux substantially, then, it is transmitted through the expander optical system EXP to be converted into the divergent light flux, and after being regulated in terms of a diameter of the light flux by aperture regulating element AP, it becomes a spot formed by objective lens system OBJ on information recording surface RL2 through the second protective layer PL2. The objective lens system OBJ is driven for focusing and tracking by biaxial actuator AC1 arranged on its periphery. A reflected light flux modulated by information pits on information recording surface RL2 is transmitted again through objective lens system OBJ, aperture regulating element AP and expander optical system EXP, then, is made to be a converged light flux by collimator lens COL, to be reflected twice in the prism PS to be converged on light-receiving section DS2. Thus, information recorded on DVD can be read by using output signals of the light-receiving section DS2.

When conducting recording and reproducing of information for CD, in the optical pickup apparatus PU2, laser module LM is operated to drive the third light-emitting section EP3 to emit light. A divergent light flux emitted from the third light-emitting section EP3 is reflected by prism PS, as its light path is shown with one-dot chain lines in FIG. 7(a), then, it passes through collimator lens COL to be converted into a parallel light flux substantially, then, it is transmitted through the expander optical system EXP to be converted into the divergent light flux, and after being regulated in terms of a diameter of the light flux by aperture regulating element AP, it becomes a spot formed by objective lens system OBJ on information recording surface RL3 through the third protective layer PL3. The objective lens system OBJ is driven for focusing and tracking by biaxial actuator AC1 arranged on its periphery. A reflected light flux modulated by information pits on information recording surface RL3 is transmitted again through objective lens system OBJ, aperture regulating element AP and expander optical system EXP, then, is made to be a converged light flux by collimator lens COL, to be reflected twice in the prism PS to be converged on light-receiving section DS3. Thus, information recorded on CD can be read by using output signals of the light-receiving section DS3.

Next, objective lens system OBJ will be explained. The objective lens system OBJ is of the structure wherein the first lens group L1 that is arranged on the object side and has negative paraxial power $P_1$ (mm$^{-1}$) and the second lens group L2 that is a condenser lens group for converging a light flux emitted from the first lens group L1 on information recording surface RL of optical disc BD, and has positive paraxial power $P_2$ (mm$^{-1}$) are united solidly by holder B1, and it satisfies the following expression (1). Incidentally, on the light source side on the holder B1, there is engaged holder B2 on which the aperture regulating element AP is mounted.

$$0.02 < |P_1/P_2| < 0.30 \quad (1)$$

Figure 4:
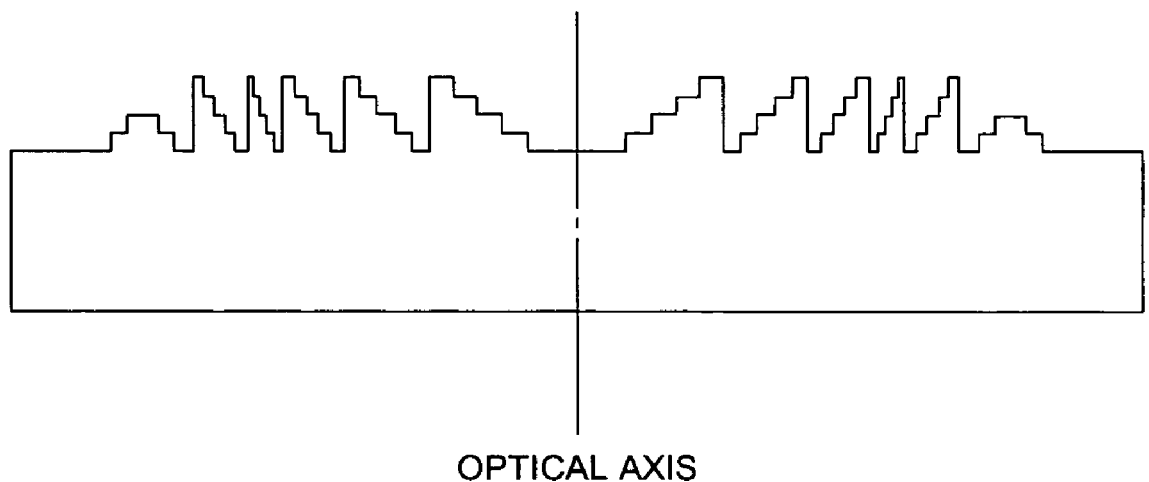
FIG. 4(b) is a diagram showing an example of a diffractive structure.
Each of FIG. 5(a)
Figure 4:
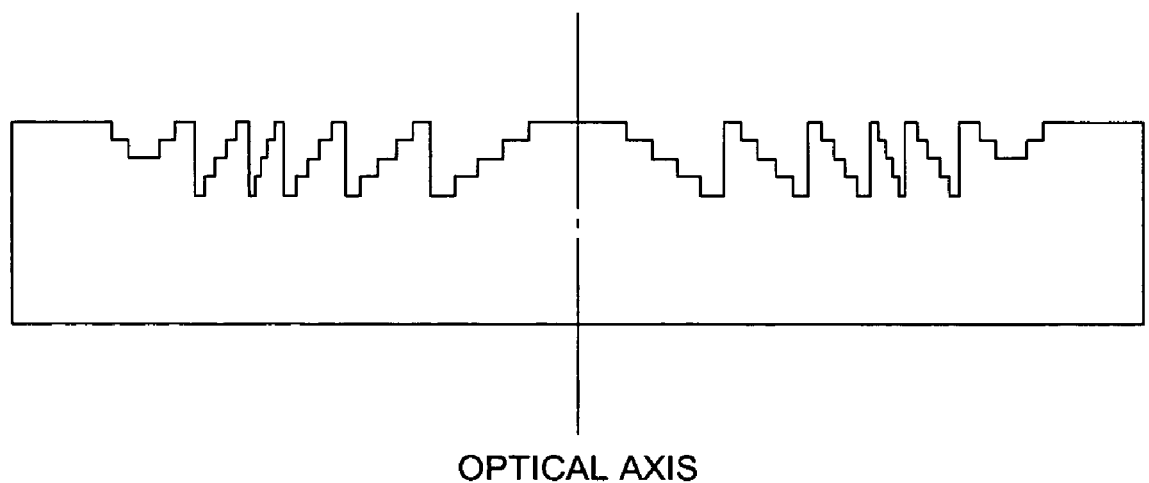

On the optical surface on the light source side on the first lens group L1 of the objective lens OBJ, there is provided a wavelength-selection diffractive structure wherein each ring-shaped zone is divided into five to be in a form of stairs as shown in FIG. 4, and a height of each step of the stairs is established to $2 \times \lambda_1/(N_{\lambda 11}-1)$ where $\lambda_1$ represents the first wavelength and $N_{\lambda 11}$ represents a refractive index of the first lens group for $\lambda_1$. This wavelength-selection diffractive structure transmits the first light flux with wavelength $\lambda_1$ and the third light flux with wavelength $\lambda_3$, and diffracts selectively the second light flux with wavelength $\lambda_2$ only, and thereby corrects spherical aberration caused by a difference of protective layer thickness between BD and DVD.

Figure 5:
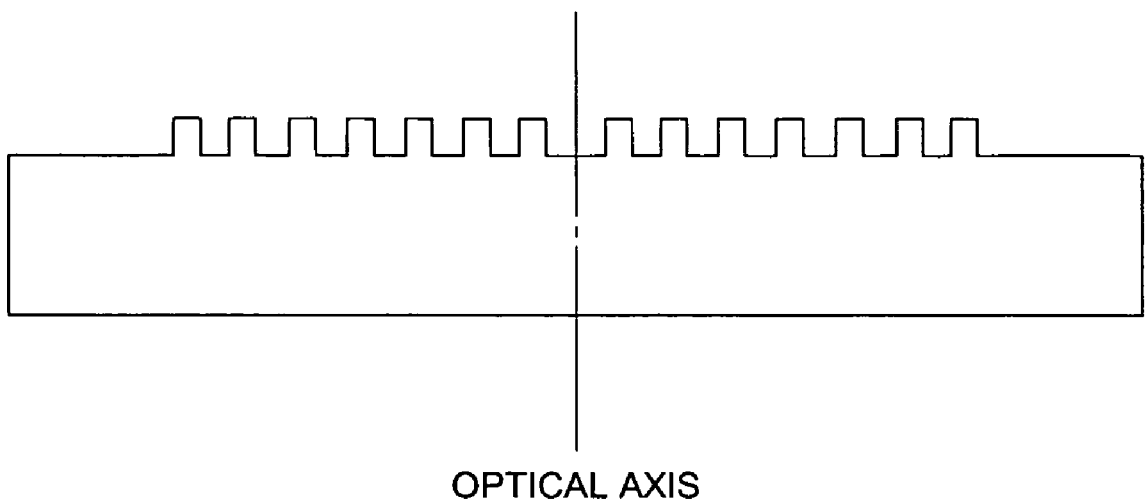
FIG. 5(b) is a diagram showing an example of a diffractive structure.
Figure 5:
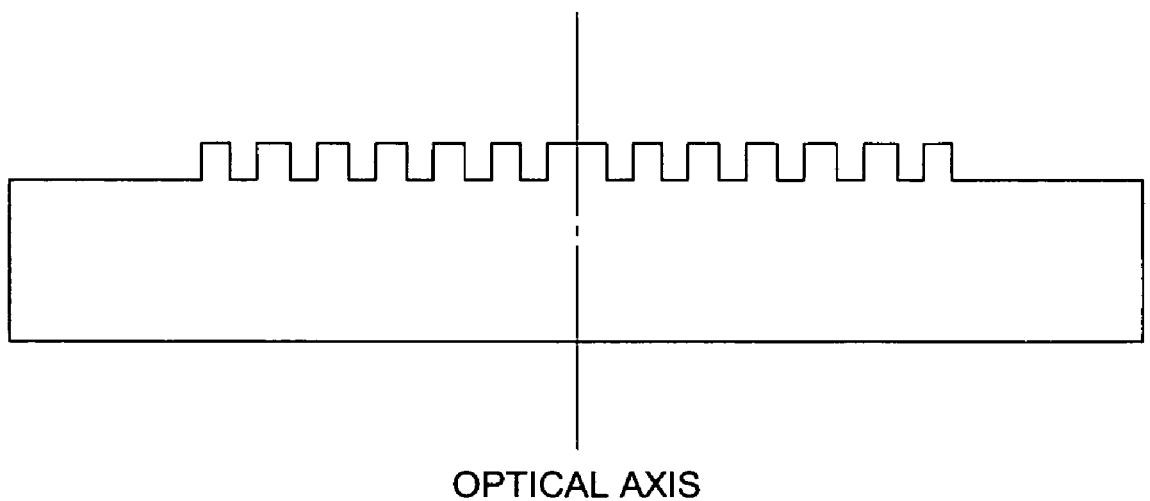

Further, on the optical surface of the first lens group L1 on the optical disc side, there is provided a wavelength-selection diffractive structure wherein each ring-shaped zone is divided into two to be in a form of stairs as shown in FIG. 5, and a height of each step of the stairs is established to $5 \times \lambda_1 (N_{\lambda 11}-1)$ where $\lambda_1$ represents the first wavelength and $N_{\lambda 11}$ represents a refractive index of the first lens group L1 for $\lambda_1$. This wavelength-selection diffractive structure transmits the first light flux with wavelength $\lambda_1$ and the third light flux with wavelength $\lambda_2$, and diffracts selectively the third light flux with wavelength $\lambda_3$ only, and thereby corrects spherical aberration caused by a difference of protective layer thickness between BD and CD.

EXAMPLE 2

Figure 9:
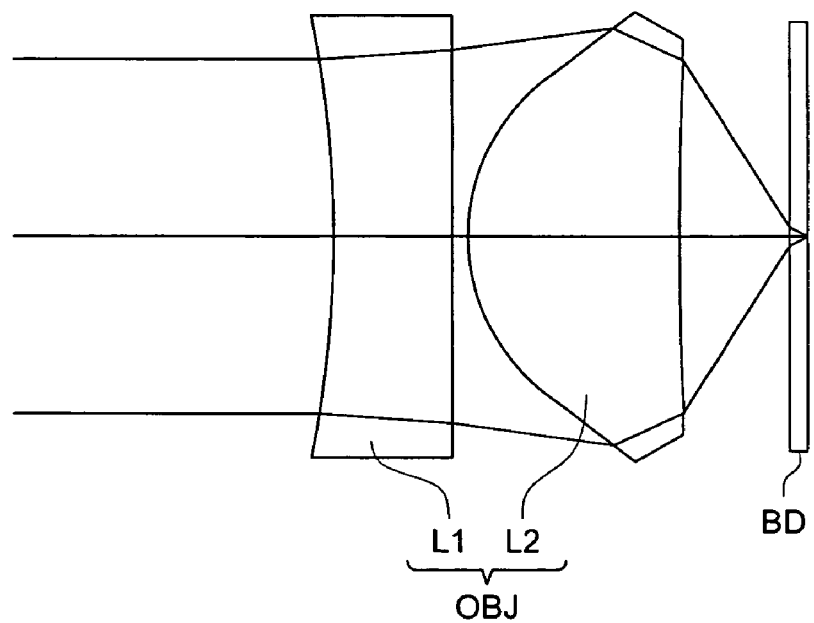
FIG. 9 is a sectional view of an objective lens OBJ in Example 2 (HD).
Figure 10:
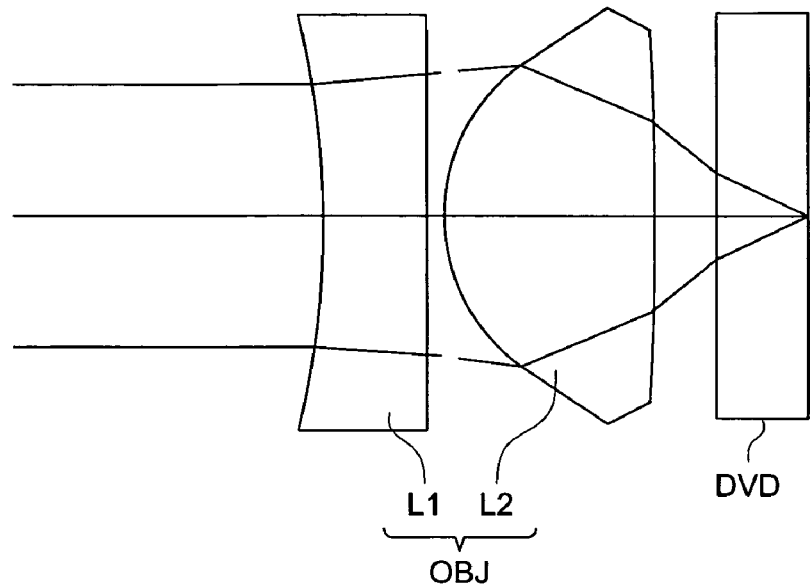
FIG. 10 is a sectional view of an objective lens OBJ in Example 2 (DVD).
Figure 11:
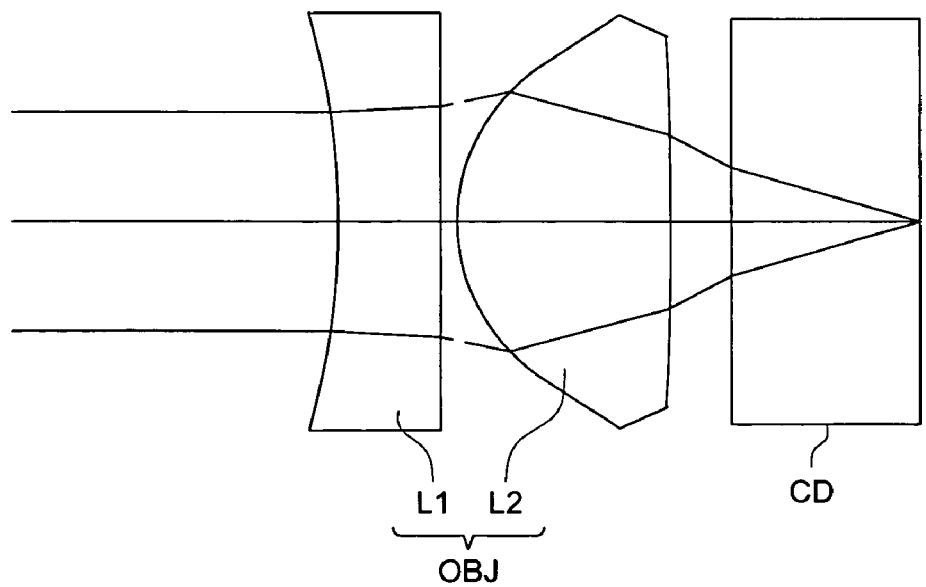
FIG. 11 is a sectional view of an objective lens OBJ in Example 2 (CD).

An objective lens suitable for the second optical pickup apparatus PU2 will be explained. Each of FIGS. 9-11 shows a diagram of an optical path for the objective lens system in Example 2, and its lens data are shown in Table 2. The first lens group is a plastic lens, and the second lens group is a glass lens ("M-NBF1" made by HOYA Co. is used). They are in the design to correct spherical aberration caused by a protective layer thickness difference between BD and DVD by the wavelength-selection diffractive structure formed on the optical surface on the light source side (First surface in Table 2) of the first lens group, and to correct spherical aberration caused by a protective layer thickness difference between BD and CD by the wavelength-selection diffractive structure formed on the optical surface on the optical disc side (Second surface in Table 2) of the first lens group. In spite of the objective lens system with a diameter that is as small as 2.285 mm in terms of incident light flux diameter D, a working distance of 0.643 mm for BD and a working distance of 0.4 mm for CD having a thick protective layer are secured.

TABLE 2

(Example 2)

(Paraxial data)

| Surface No. | r(mm) | d(mm) | $N_{BD}$ | $N_{dvd}$ | $N_{CD}$ | $N_d$ | $v_d$ | Remarks |
|---|---|---|---|---|---|---|---|---|
| OBJ | | ∞ | | | | | | Light-emitting point |
| STO | | 0.5000 | | | | | | Diaphragm |
| 1 | −6.5137 | 0.7000 | 1.5242 | 1.5064 | 1.5032 | 1.5091 | 56.5 | Objective lens system |
| 2 | ∞ | 0.1000 | | | | | | |
| 3 | 1.0547 | 1.3500 | 1.7683 | 1.7387 | 1.7331 | 1.7433 | 49.3 | |
| 4 | −6.3219 | d4 | | | | | | |
| 5 | ∞ | d5 | 1.6211 | 1.5798 | 1.5733 | 1.5733 | 30.0 | Protective layer |
| 6 | ∞ | | | | | | | |

$d4_{BD} = 0.6426$, $d4_{DVD} = 0.4000$, $d4_{CD} = 0.4000$,
$d5_{BD} = 0.1000$, $d5_{DVD} = 0.6000$, $d5_{CD} = 1.2000$ (Aspheric surface coefficient)

| | First surface | Third surface | Fourth surface |
|---|---|---|---|
| κ | 0.28162E+01 | −0.67394E+00 | −0.39131E+03 |
| A4 | 0.13774E−02 | 0.20150E−01 | 0.85249E−01 |
| A6 | 0.34466E−03 | −0.12348E−01 | −0.36260E−01 |
| A8 | −0.21498E−03 | 0.24994E−01 | −0.11602E−01 |
| A10 | 0.60323E−04 | −0.12155E−01 | −0.61398E−02 |
| A12 | 0.00000E+00 | −0.23722E−02 | 0.14569E−01 |
| A14 | 0.00000E+00 | 0.48913E−02 | −0.65775E−02 |
| A16 | 0.00000E+00 | −0.41636E−03 | 0.78225E−03 |
| A18 | 0.00000E+00 | −0.58317E−03 | 0.00000E+00 |
| A20 | 0.00000E+00 | −0.12971E−03 | 0.00000E+00 |

(Optical path difference function coefficient)

| | First surface | Second surface |
|---|---|---|
| $n_{BD}/n_{DVD}/n_{CD}$ | 0/1/0 | 0/0/1 |
| λB | 658 nm | 785 nm |
| B2 | 0.79001E−02 | 0.77267E−01 |
| B4 | −0.53864E−02 | 0.17830E−02 |
| B6 | −0.48586E−02 | 0.17763E−01 |
| B8 | 0.84541E−03 | −0.19270E−01 |
| B10 | −0.81937E−03 | 0.21775E−01 |

(Specifications of the objective lens system): include first wavelength λ1=408 nm, second wavelength λ2=658 nm, third wavelength λ3=785 nm, image side numerical aperture $NA_{BD}$ in using BD=0.85, image side numerical aperture $NA_{DVD}$ in using DVD=0.65, image side numerical aperture $NA_{CD}$ in using CD=0.45, incident light flux diameter $D_{BD}$ in using BD=2.285 mm, focal length $f_{BD}$ in using BD=1.243 mm, magnification $m_{BD}$ in using BD=0, magnification $m_{DVD}$ in using DVD=0, magnification $m_{CD}$ in using CD=0, and paraxial power ratio $|P_1/P_2|_{BD}$=0.1029, (Specification of the first lens group) includes paraxial power $P_{1BD}$=−0.080 (mm$^{-1}$) and (Specifications of the second lens group) include focal length $f_{2BD}$=1.278 mm, magnification $m_{2BD}$=−0.108 and paraxial power $P_{2BD}$=0.782 (mm$^{-1}$).

(Explanation of the Wavelength-Selection Diffractive Structure on the First Surface)

The wavelength-selection diffractive structure is composed of plural ring-shaped zones, and each ring-shaped zone is divided into 5 parts to be in a form of stairs. Step Δ in the stair-shaped structure in each ring-shaped zone is established to satisfy Δ=2·λ1/($N_{BD}$−1), where $N_{BD}$ represents the refractive index of the first lens group with the first wavelength λ1.

Since the optical path difference to be added to the first light flux by the stair-shaped structure is 2×λ1, the first light flux is not subjected to any action by the wavelength-selection diffractive structure, and is transmitted as it is through the wavelength-selection diffractive structure. Further, since the optical path difference to be added to the third light flux by the stair-shaped structure is 1×λ3, the third light flux is not subjected to any action either by the wavelength-selection diffractive structure and is transmitted as it is. On the other hand, an optical path difference added to the second light flux by the stair-shaped structure is about 0.2×λ2, and therefore, an optical path difference of just 1×λ2 is added for an amount equivalent to one ring-shaped zone divided into five parts, thus, the-first-order diffracted light is generated. By diffracting only the second light flux selectively as stated above, spherical aberration caused by a difference of protective layer thickness between BD and DVD can be corrected. Incidentally, the diffraction efficiency of 0-order diffracted light (transmitted light) of the first light flux generated by the diffractive structure is 100%, the diffraction efficiency of first-order diffracted light of the second light flux is 87%, and the diffraction efficiency of 0-order diffracted light (transmitted light) of the third light flux is 100%, thus, high diffraction efficiency is obtained for any light flux.

(Explanation of the Wavelength-Selection Diffractive Structure on the Second Surface)

The wavelength-selection diffractive structure is composed of plural ring-shaped zones, and each ring-shaped zone is divided into 2 parts to be in a form of stairs. Step $\Delta$ in the stair-shaped structure in each ring-shaped zone is established to satisfy $\Delta = 5 \cdot \lambda 1/(N_{BD}-1)$, where $N_{BD}$ represents the refractive index of the first lens group with the first wavelength $\lambda 1$. Since the optical path difference to be added to the first light flux by the stair-shaped structure is $5 \times \lambda 1'$, the first light flux is not subjected to any action by the wavelength-selection diffractive structure, and is transmitted as it is through the wavelength-selection diffractive structure. Further, since the optical path difference to be added to the second light flux by the stair-shaped structure is $3 \times \lambda 2$, the second light flux is not subjected to any action either by the wavelength-selection diffractive structure and is transmitted as it is. On the other hand, an optical path difference added to the third light flux by the stair-shaped structure is about $0.5 \times \lambda 3$, and therefore, an optical path difference is shifted by a half of wavelength for an amount equivalent to one ring-shaped zone divided into two parts, thus, the most part of an amount of light of the third light flux entering the wavelength-selection diffractive structure is divided into the first-order diffracted light and -first-order diffracted light. This wavelength-selection diffractive structure is designed so that the first-order diffracted light may be converged on an information recording surface of CD, and spherical aberration caused by a difference of protective layer thickness between BD and CD is corrected by the diffracting actions of the wavelength-selection diffractive structure. Incidentally, the diffraction efficiency of 0-order diffracted light (transmitted light) of the first light flux generated by the diffractive structure is 100%, the diffraction efficiency of 0-order diffracted light (transmitted light) of the second light flux is 100%, and the diffraction efficiency of the first-order diffracted light of the third light flux is 40.5%, thus, high diffraction efficiency is obtained for BD and DVD for which the higher speed is required for recording.

Incidentally, though the design wherein magnification $M_{CD}$ in the case of using CD is made to be zero (entering of parallel light) is employed in the objective lens system of the present example, it is also possible to use a design wherein a longer working distance can be secured while easing a pitch of ring-shaped zones of the wavelength-selection diffractive structure on the second surface, by causing divergent light to enter. Owing to this, it is possible to control a decline of diffraction efficiency caused by shape errors of the wavelength-selection diffractive structure, and to prevent an interference between CD and the objective lens in conducting recording and reproducing.

Third Embodiment

Figure 12:
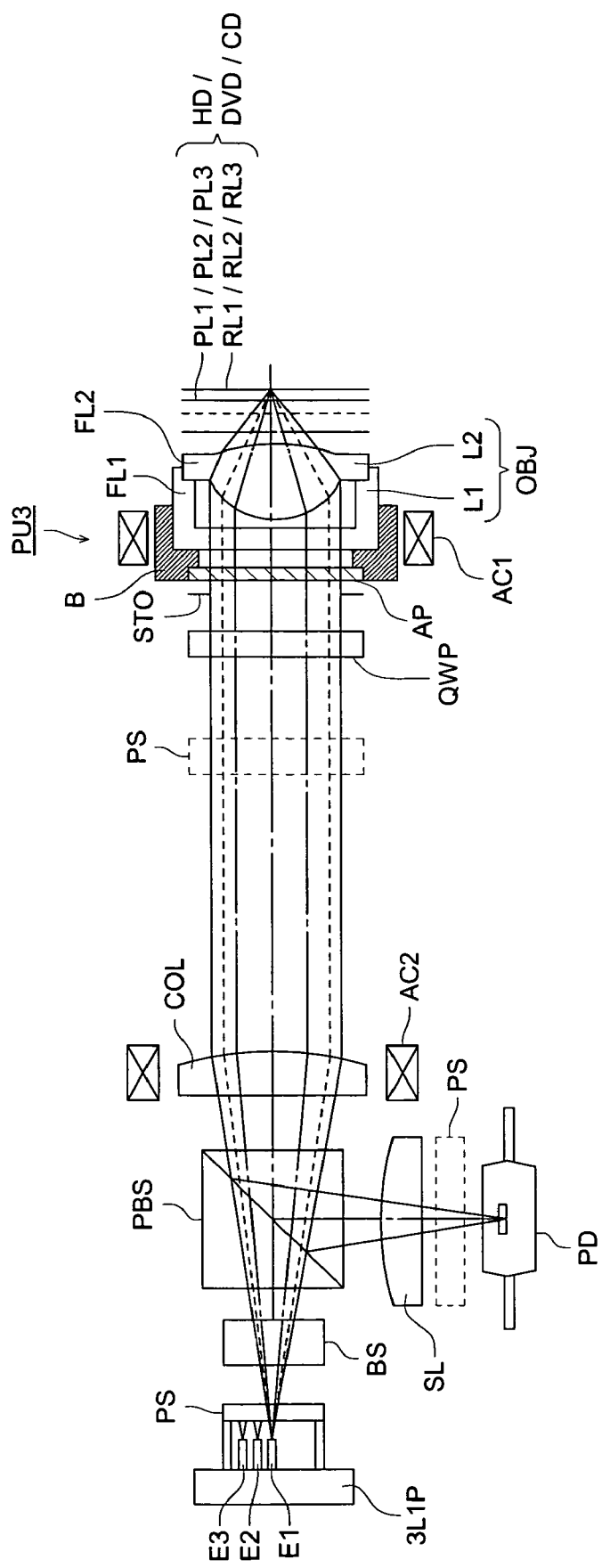
FIG. 12 is a diagram showing schematically the structure of the third optical pickup apparatus.
Each of FIG. 13(a), FIG. 13(b)

FIG. 12 is a diagram showing schematically the structure of third optical pickup apparatus PU3 capable of conducting recording and reproducing of information properly with a simple constitution for any of high density optical disc BD (first optical disc), DVD (second optical disc) and CD (third optical disc). Optical specifications of the high density optical disc BD include first wavelength $\lambda 1=408$ nm, first protective layer PL1 thickness t1=0.1 mm and numerical aperture NA1=0.85, optical specifications of DVD include second wavelength $\lambda 2=658$ nm, second protective layer PL2 thickness t2=0.6 mm and numerical aperture NA2=0.60, and optical specifications of CD include third wavelength $\lambda 3=785$ nm, third protective layer PL3 thickness t3=1.2 mm and numerical aperture NA3=0.45.

The optical pickup apparatus PU3 has therein 3 laser 1 package 3L1P housing in its same package (united light source units) the first light-emitting section EP1 (first light source) that emits a laser light flux (first light flux) with wavelength of 408 nm emitted when conducting recording and reproducing of information for high density optical disc BD, the second light-emitting section EP2 (second light source) that emits a laser light flux (second light flux) with wavelength of 658 nm emitted when conducting recording and reproducing of information for DVD, and the third light-emitting section EP3 (third light source) that emits a laser light flux (third light flux) with wavelength of 785 nm emitted when conducting recording and reproducing of information for CD, prism PS representing optical path combining means (mounted on the case of 3 laser 1 package 3L1P to be united in FIG. 8), photodetector PD, objective optical system OBJ composed of aberration correcting element L1 on which the diffractive structure representing a phase structure is formed on the optical surface and of light-convergent element L2 having on its both sides aspheric surfaces having functions to converge laser light fluxes transmitted through the aberration correcting element L1 on information recording surfaces RL1, RL2 and RL3, aperture regulating element AP, biaxial actuator AC1, uniaxial actuator AC2, diaphragm STO corresponding to numerical aperture NA1 of high density optical disc BD, polarizing beam splitter PBS, collimator lens COL (movable element), lens for sensor SL, beam shaping element SH and ¼ wavelength plate QWP. Incidentally, with respect to the objective optical system OBJ, the one same as that provided in the first optical pickup apparatus PU1 can be used, thus, an explanation thereof is omitted. The structure and actions of the prism PS will be described later.

In the optical pickup apparatus PU3, when conducting recording and reproducing of information for high density optical disc BD, 3-laser 1-package 3L1P is operated to drive the first light-emitting section EP1 to emit light. A divergent light flux emitted from the first light-emitting section EP1 is transmitted through prism PS, then, is transmitted through beam shaping element SH as its light path is drawn with solid lines in FIG. 8, and thereby, its cross section is shaped from an oval to a circle, then, it is transmitted through polarizing beam splitter PBS, and passes through ¼ wavelength plate QWP after being converted to parallel light flux by collimator lens COL, then, is regulated by diaphragm STO in terms of a diameter of the light flux, and is transmitted through aperture regulating element AP to become a spot that is formed on information recording surface RL1 through first protective layer PL1 by the objective lens. The objective lens system OBJ is driven by biaxial actuator AC1 arranged on its periphery for focusing and tracking. A reflected light flux modulated by information pits on information recording surface RL1 passes again through objective lens system OBJ, aperture regulating element AP and ¼ wavelength plate QWP, then, is made to be a converged light flux by collimator lens COL, to be reflected in the polarizing beam splitter PBS to be received by photodetector PD after being transmitted through lens for sensor SL. Information recorded on high density optical disc BD can be read by using output signals of the photodetector PD.

Further, when conducting recording and reproducing of information for DVD in the optical pickup apparatus PU3, collimator lens COL is moved by uniaxial actuator AC2 so that the second light flux may emerge from the collimator lens COL in a form of a parallel-light flux. After that, the 3-laser 1-package 3L1P is operated to drive the second light-emitting section EP2 to emit light. Incidentally, after the second light-emitting section EP2 is made to emit light, the collimator lens COL may be moved while searching the optimum position.

A divergent light flux emitted from the second light-emitting section EP2 is changed in terms of its optical path by prism PS, and thereby, its optical axis is aligned with that of a divergent light flux emitted from the first light-emitting section EP1, and its cross section is shaped from an oval to a circle when it is transmitted through-beam shaping element SH as its optical path is drawn with dotted lines in FIG. 8, then, it is transmitted through polarizing beam splitter PBS, and after passing through collimator lens COL to be made a parallel light flux, its light flux diameter is regulated by diaphragm STO, and it is transmitted through ¼ wavelength plate QWP and aperture regulating element AP to become a spot that is formed on information recording surface RL2 through second protective layer PL2 by the objective lens system OBJ. The objective lens system OBJ is driven by biaxial actuator AC1 arranged on its periphery for focusing and tracking. A reflected light flux modulated by information pits on information recording surface RL2 passes again through objective lens system OBJ, aperture regulating element AP and ¼ wavelength plate QWP, then, is made to be a converged light flux by collimator lens COL, to be reflected in the polarizing beam splitter PBS to be received by photodetector PD after being transmitted through lens for sensor SL. Information recorded on DVD can be read by using output signals of the photodetector PD.

Further, when conducting recording and reproducing of information for CD in the optical pickup apparatus PU3, collimator lens COL is moved by uniaxial actuator AC2 so that the third light flux may emerge from the collimator lens COL in a form of a parallel light flux. After that, the 3-laser 1-package 3L1P is operated to drive the third light-emitting section EP3 to emit light. Incidentally, after the third light-emitting section EP3 is made to emit light; the collimator lens COL may be moved while searching the optimum position.

A divergent light flux emitted from the third light-emitting section EP3 is changed in terms of its optical path by prism PS, and thereby, its optical axis is aligned with that of a divergent light flux emitted from the first light-emitting section EP1, and it passes through lens for sensor SL as its optical path is drawn with one-dot chain lines in FIG. 8, then, it is transmitted through polarizing beam splitter PBS, and after passing through collimator lens COL to be made a parallel light flux, its light flux diameter is regulated by diaphragm STO, and it is transmitted through ¼ wavelength plate QWP and aperture regulating element AP to become a spot that is formed on information recording surface RL3 through third protective layer PL3 by the objective lens system OBJ. The objective lens system OBJ is driven by biaxial actuator AC1 arranged on its periphery for focusing and tracking. A reflected light flux modulated by information pits on information recording surface RL3 passes again through objective lens system OBJ, aperture regulating element AP and ¼ wavelength plate QWP, then, is made to be a converged light flux by collimator lens COL, to be reflected in the polarizing beam splitter PBS to be received by photodetector PD after being transmitted through lens for sensor SL. Information recorded on CD can be read by using output signals of the photodetector PD.

In the present embodiment, the collimator lens COL is arranged in a common optical path for the first-third light fluxes, and is constructed so that its position may be adjusted in the optical axis direction by uniaxial actuator AC2, thus, as stated above, chromatic aberration among the first wavelength $\lambda 1$, the second wavelength $\lambda 2$ and the third wavelength $\lambda 3$ is absorbed, and a light flux with any wavelength can emerge from the collimator lens COL in a form of a parallel light flux. Further, by moving the collimator lens COL in the optical axis direction when conducting recording and reproducing of information for high density optical disc BD, spherical aberration of the spot formed on information recording surface RL1 of the high density optical disc BD can be corrected, thus, excellent characteristics of recording and reproducing can be maintained constantly for the high density optical disc BD.

Figure 13:
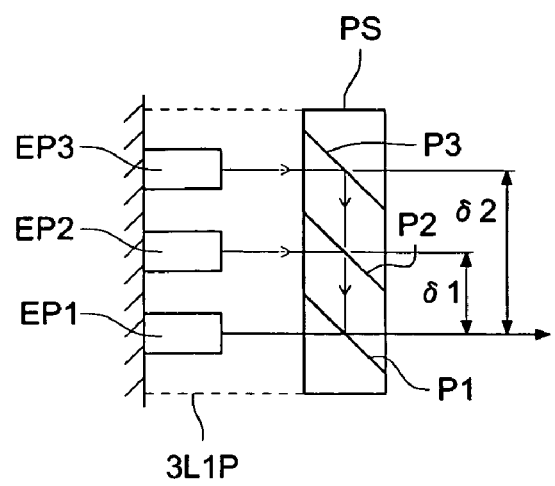
FIG. 13(c) is a diagram showing the schematic structure of three-laser one-package 3L1P which can be used for the optical pickup apparatus PU3 relating to the third embodiment.
Figure 13:
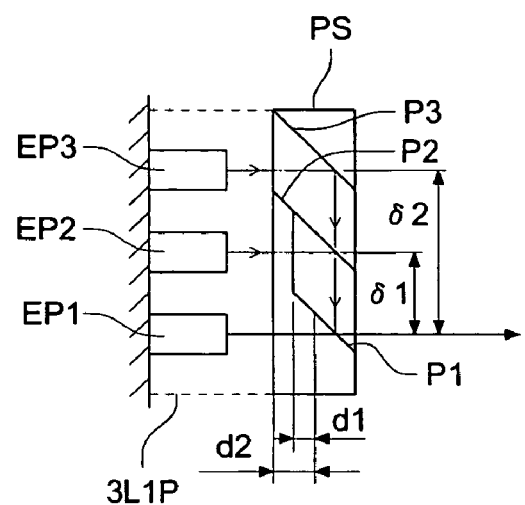
Figure 13:
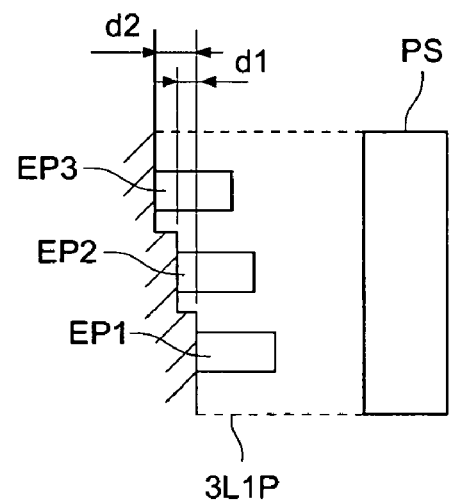

Each of FIGS. 13 (a)-13(c) is a diagram showing a schematic structure of the prism PS. Incidentally, in each of the FIGS. 13 (a)-13(c), a light flux emitted from the light-emitting section is schematically shown with straight lines. Practically, however, a divergent light flux is emitted.

In FIG. 13(a), prism PS is composed of four prism elements, and each of surfaces P1-P3 is a surface on which adjoining prism elements are cemented, and specifically, there are provided selective transmission-type surfaces P1 and P2 each being subjected to dichroic coating and reflecting surface P3. The selective transmission-type surface P1 has a function to transmits the first light flux with wavelength $\lambda 1$ and reflects the second light flux with wavelength $\lambda 2$ and the third light flux with wavelength $\lambda 3$. On the other hand, the selective transmission-type surface P2 has a function to transmits the third light flux with wavelength $\lambda 3$ and reflects the second light flux with wavelength $\lambda 2$.

Therefore, the light flux emitted from the second light-emitting section EP2 is reflected by the selective transmission-type surface P2, then, reflected by the selective transmission-type surface P1, and is led into the optical path of the light flux emitted from the light-emitting section EP1. On the other hand, the light flux emitted from the third light-emitting section EP3 is reflected on reflecting surface P3, then is transmitted through the selective transmission-type surface P2, and is reflected on the selective transmission-type surface P1 to be led into the optical path of the light flux emitted from the first light-emitting section EP1. Through the foregoing, composing of optical paths is carried out for three light fluxes each having a different light-emitting point.

In the present embodiment, prism P3 conducts composing of optical paths between the 3-laser 1-package 3L1P and the coupling lens (collimator lens COL in this case) for three light fluxes respectively with different wavelengths $\lambda 1$-$\lambda 3$, and thereby, composing of optical paths is realized only by the optical actions, without requiring any driving system, thus, space saving is achieved, handling of light fluxes between prism PS and objective lens OBJ becomes easy, and a light-converging optical system, for example can be simplified. Incidentally, prism PS does not necessarily need to be united with the 3-laser 1-package 3L1P, but can be provided separately. It is further possible to provide a diffractive structure on a plane of incidence or on a plane of emergence of the prism PS to support optical path composing or to adjust an optical path length.

FIG. 13(b) shows an example wherein a form of a prism is designed by providing a step on the light source side on each prism element so that the prism may have a function as an optical path length adjusting means. In this case, step portions d1 and d2 are provided on a prism where light fluxes respectively with wavelengths enter, so that optical path lengths may be generated. With respect to the structure wherein light fluxes emitted from respective light sources are reflected or transmitted to emerge, it is the same as one shown in FIG. 13(a).

In this case, the structure is arranged so that an optical path difference of d1 in the optical axis direction may be generated between the light flux emitted from the light-emitting section EP1 and the light flux emitted from the light-emitting section EP2, and an optical path difference of d2 in the optical axis direction may be generated between the light flux emitted from the light-emitting section EP1 and the light flux emitted from the light-emitting section EP3.

Accordingly, optical path difference δ1 and optical path difference δ2 both in the direction perpendicular to the optical axis direction shown in the figure are generated, and a problem that a focal length is changed by the wavelength difference can be solved.

For example, for a coupling lens and a collimator, even when they are designed to be optimum for the light source having the shortest wavelength, a focal length of each of them is changed undesirably to be longer for a light flux emitted from the light source whose wavelength is longer than the aforementioned shortest wavelength. In the same way, for the beam shaping element, astigmatism is caused when a light source to be used is changed. For these problems, it is possible to make magnifications to be the same, by giving different power selectively for each wavelength by the use of a diffractive structure, which, however, reduces a quantity of light.

Now, the problem of shifting of the focus position mentioned above can be solved by giving a different optical path difference to each wavelength, as shown in FIG. 13(b). Though wavelengths are arranged to be longer from the light-emitting section EP1 to the light-emitting section EP3 in this case, it is possible to change an arrangement for light-emitting points as occasion demands, and in that case, a step of the prism may be changed accordingly. Incidentally, as shown in FIG. 13(c), an optical path length adjusting means may be composed by changing shapes of pedestals for the light-emitting sections EP1-EP3, and thereby, by giving, for example, differences d1 and d2 in installation heights.

Though it is arranged that all light fluxes enter the objective lens OBJ in a form of infinite collimated light, in the present embodiment, it is also possible to arrange so that the first light flux with wavelength λ1 enters in a form of infinite collimated light, the second light flux with wavelength λ2 enters in a form of a finite divergent light with the first degree of divergence and the third light flux with wavelength λ3 enters at the second degree of divergence that is greater than the first degree of divergence.

Further, in the present embodiment, the prism PS serves also as the optical path length adjusting means that gives a different optical path length to each wavelength. More specifically, after the second light flux with wavelength λ2 passes through the prism PS, an optical path length of the second light flux is longer by δ1 than that of the first light flux with wavelength λ1, and after the third light flux with wavelength λ3 passes through the prism PS, an optical path length of the third light flux is longer by δ2 than that of the first light flux with wavelength λ1, thus, a focus position can be adjusted optionally, and thereby, a fluctuation of the focal length caused by a wavelength difference can be corrected.

Figure 14:
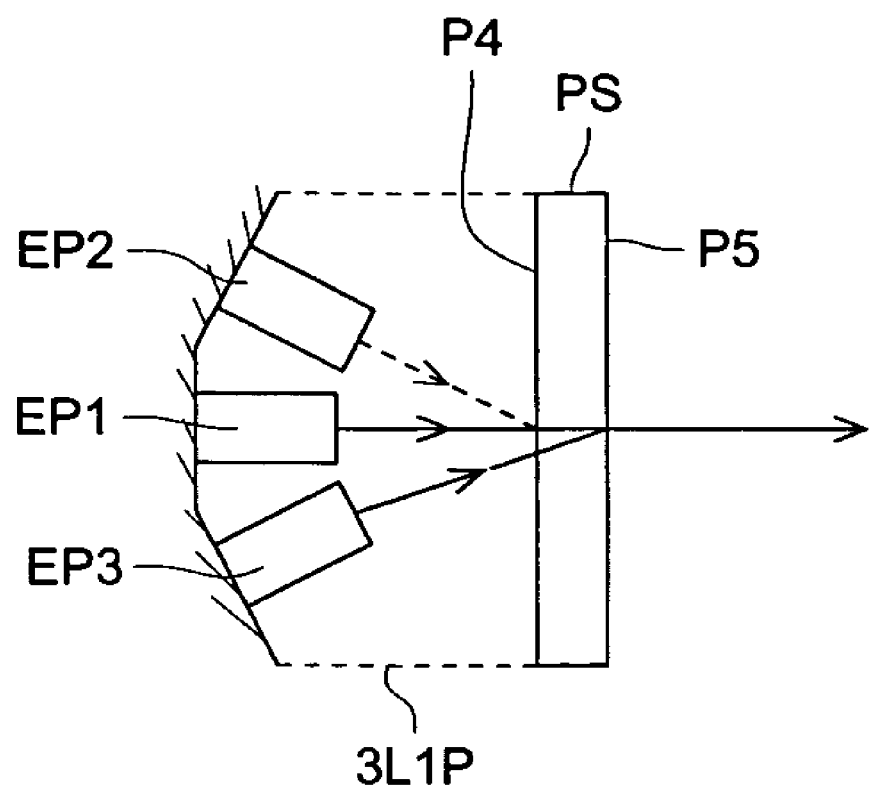
FIG. 14 is a diagram showing the schematic structure of three-laser one-package 3L1P which can be used for the optical pickup apparatus PU3 relating to the third embodiment.

FIG. 14 is a diagram showing a schematic structure of the variation of 3-laser 1-package 3L1P that can be used in optical pickup apparatus PU3 relating to the Third Embodiment. In the present embodiment, diffractive element DE is arranged on a plane of emergence of the 3-laser 1-package 3L1P. On plane of incidence P4 and plane of emergence P5 of the diffractive element DE, there are formed respectively diffractive structures each having a different function. In the second light-emitting section EP2, an optical axis of the light flux emitted therefrom is inclined so that it intersects an optical axis of a light flux emitted from the first light-emitting section EP1 on the plane of incidence P4 of the diffractive element DE, and in the third light-emitting section EP3, an optical axis of the light flux emitted therefrom is inclined so that it intersects an optical axis of a light flux emitted from the first light-emitting section EP1 on the plane of emergence PS of the diffractive element DE.

More specifically, the diffractive structure of the plane of incidence P4 is designed so that the diffraction efficiency for the zero-order diffracted light is the highest when a light flux with wavelength λ1 enters, the diffraction efficiency for the $n^{th}$ order diffracted light is the highest when a light flux with wavelength λ2 enters, and the diffraction efficiency for the zero-order diffracted light is the highest when a light flux with wavelength λ3 enters. On the other hand, the diffractive structure of the plane of emergence P5 is designed so that the diffraction efficiency for the zero-order diffracted light is the highest when a light flux with wavelength λ1 enters, the diffraction efficiency for the zero-order diffracted light is the highest when a light flux with wavelength λ2 enters, and the diffraction efficiency for the $m^{th}$ order diffracted light is the highest when a light flux with wavelength λ3 enters.

Therefore, by making an angle of emergence of the $n^{th}$ order diffracted light and an installing angle for the second light-emitting section EP2 to agree with each other and by making an angle of emergence of the $m^{th}$ order diffracted light and an installing angle for the third light-emitting section EP3 to agree with each other, a light flux emitted from the second light-emitting section EP2 is led to an optical path of a light flux emitted from the first light-emitting section EP1 and a light flux emitted from the third light-emitting section EP3 is also led to an optical path of a light flux emitted from the first light-emitting section EP1. Since the combination of the optical paths is carried out for three optical fluxes each having a different light-emitting point, an effect that is the same as that in the embodiment can be obtained. As is apparent from FIG. 14, the diffractive element DE serves as also the optical path length adjusting means that gives different optical path length to each wavelength, because an optical path length from each light-emitting section to the diffractive element DE is different.

Prism PS representing an optical path combining element shown in FIG. 13(or diffractive element shown in FIG. 14) may also be arranged between collimator lens COL and objective lens OBJ or between objective lens OBJ and photoconductor PD, as shown by dotted lines in FIG. 12.

Next, the specific objective lens relating to the invention described in Structure (37) will be explained. Every one of them is a glass lens, and by satisfying any one of the conditions (I)-(VI), a sufficient tolerance for surface shifting errors and sufficient working distance are secured in spite of the objective lens with high NA. Incidentally, in any case, a diaphragm ("STO" in Tables 3-8) is arranged at the vertex position on the optical surface on the light source side.

EXAMPLE 3

Lens data are shown in Table 3.

TABLE 3

(Example 3)

(Paraxial data)

| Surface No. | r(mm) | d(mm) | $N_\lambda$ | $N_d$ | $v_d$ | Remarks |
|---|---|---|---|---|---|---|
| OBJ | ∞ | | | | | Light-emitting point |
| STO | | 0.0000 | | | | Diaphragm |
| 1 | 1.4466 | 2.4500 | 1.7690 | 1.7433 | 49.3 | Objective lens system |
| 2 | −5.7873 | 0.4028 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.61234E+00 | −0.67567E+03 |
| A4 | 0.10544E−01 | 0.17946E+00 |
| A6 | −0.17917E−02 | −0.46996E+00 |
| A8 | 0.38543E−02 | 0.45004E+00 |
| A10 | −1.15575E−02 | −0.16864E+00 |
| A12 | −0.38877E−03 | 0.00000E+00 |
| A14 | 0.54950E−03 | 0.00000E+00 |
| A16 | −0.14902E−03 | 0.00000E+00 |
| A18 | 0.00000E+00 | 0.00000E+00 |
| A20 | 0.00000E+00 | 0.00000E+00 |

EXAMPLE 4

Table 4 shows lens data.

TABLE 4

(Example 4)

(Paraxial data)

| Surface No. | r(mm) | d(mm) | $N_\lambda$ | $N_d$ | $v_d$ | Remarks |
|---|---|---|---|---|---|---|
| OBJ | ∞ | | | | | Light-emitting point |
| STO | | 0.0000 | | | | Diaphragm |
| 1 | 1.0441 | 1.6000 | 1.7156 | 1.6935 | 53.2 | Objective lens system |
| 2 | −11.2393 | 0.4472 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.61997E+00 | 0.97117E+02 |
| A4 | 0.24812E−01 | 0.42587E+00 |
| A6 | 0.25538E−02 | −0.91731E+00 |
| A8 | 0.19563E−01 | 0.10536E+01 |
| A10 | −0.12683E−01 | −0.65160E+00 |
| A12 | 0.77381E−04 | 0.16993E+00 |
| A14 | 0.83211E−02 | 0.00000E+00 |
| A16 | −0.43580E−02 | 0.00000E+00 |
| A18 | 0.00000E+00 | 0.00000E+00 |
| A20 | 0.00000E+00 | 0.00000E+00 |

EXAMPLE 5

Table 5 shows lens data.

TABLE 5

(Example 5)

(Paraxial data)

| Surface No. | r(mm) | d(mm) | $N_\lambda$ | $N_d$ | $v_d$ | Remarks |
|---|---|---|---|---|---|---|
| OBJ | ∞ | | | | | Light-emitting point |
| STO | | 0.0000 | | | | Diaphragm |
| 1 | 0.4150 | 0.5500 | 1.6411 | 1.6230 | 58.1 | Objective lens system |
| 2 | −1.9942 | 0.2206 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.58804E+00 | 0.10000E+02 |
| A4 | 0.52465E+00 | 0.66745E+01 |
| A6 | −0.58862E+00 | −0.72087E+02 |
| A8 | 0.13486E+02 | 0.43977E+03 |
| A10 | −0.70915E+01 | −0.14205E+04 |
| A12 | −0.55670E+02 | 0.21098E+04 |
| A14 | −0.13763E+03 | −0.73470E+03 |
| A16 | −0.18028E+04 | 0.00000E+00 |
| A18 | 0.81913E+04 | 0.00000E+00 |
| A20 | −0.22157E+04 | 0.00000E+00 |

EXAMPLE 6

Table 6 shows lens data.

TABLE 6

(Example 6)

(Paraxial data)

| Surface No. | r(mm) | d(mm) | $N_\lambda$ | $N_d$ | $v_d$ | Remarks |
|---|---|---|---|---|---|---|
| OBJ | | 40.0000 | | | | Light-emitting point |
| STO | | 0.0000 | | | | Diaphragm |
| 1 | 1.9235 | 3.1000 | 1.8407 | 1.8061 | 40.7 | Objective lens system |
| 2 | −17.1756 | 0.6572 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.73504E+00 | −0.55394E+04 |
| A4 | 0.57256E−02 | 0.76169E−01 |
| A6 | −0.58360E−04 | −0.64852E−01 |
| A8 | 0.43523E−03 | 0.18445E−01 |
| A10 | −0.16074E−03 | 0.11164E−02 |
| A12 | 0.36612E−04 | −0.11960E−02 |
| A14 | −0.29398E−05 | 0.00000E+00 |

TABLE 6-continued (Example 6)

| | | |
|---|---|---|
| A16 | −0.18730E−06 | 0.00000E+00 |
| A18 | 0.00000E+00 | 0.00000E+00 |
| A20 | 0.00000E+00 | 0.00000E+00 |

EXAMPLE 7

Table 7 shows lens data.

TABLE 7

(Example 7)

(Paraxial data)

| Surface No. | r(mm) | d(mm) | $N_\lambda$ | $N_d$ | $\nu_d$ | Remarks |
|---|---|---|---|---|---|---|
| OBJ | | 30.0000 | | | | Light-emitting point |
| STO | | 0.0000 | | | | Diaphragm |
| 1 | 1.6850 | 2.500 | 1.7690 | 1.7433 | 49.3 | Objective lens system |
| 2 | −8.6024 | 0.8170 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.66508E+00 | −0.11630E+04 |
| A4 | 0.73325E−02 | 0.27095E−01 |
| A6 | −0.17324E−02 | −0.71200E−02 |
| A8 | 0.11140E−02 | −0.16177E−02 |
| A10 | −0.21602E−03 | −0.52408E−03 |
| A12 | −0.21464E−04 | 0.40014E−03 |
| A14 | 0.14858E−04 | 0.33950E−04 |
| A16 | −0.37205E−06 | −0.25148E−04 |
| A18 | −0.22734E−06 | 0.00000E+00 |
| A20 | −0.53353E−07 | 0.00000E+00 |

EXAMPLE 8

Table 8 shows lens data.

TABLE 8

(Example 8)

(Paraxial data)

| Surface No. | r(mm) | d(mm) | $N_\lambda$ | $N_d$ | $\nu_d$ | Remarks |
|---|---|---|---|---|---|---|
| OBJ | | 12.5000 | | | | Light-emitting point |
| STO | | 0.0000 | | | | Diaphragm |
| 1 | 0.8550 | 1.1000 | 1.7156 | 1.6935 | 53.2 | Objective lens system |
| 2 | −3.4489 | 0.5351 | | | | |
| 3 | ∞ | 0.1000 | 1.6211 | 1.5855 | 30.0 | Protective layer |
| 4 | ∞ | | | | | |

(Aspheric surface coefficient)

| | First surface | Second surface |
|---|---|---|
| κ | −0.66093E+00 | −0.24454E+03 |
| A4 | 0.49935E−01 | 0.14817E+00 |
| A6 | −0.38775E−01 | −0.11011E+00 |
| A8 | 0.91503E−01 | −0.23408E−01 |
| A10 | −0.55762E−01 | −0.90741E−02 |
| A12 | −0.15941E−01 | 0.98626E−01 |
| A14 | 0.50187E−01 | −0.85214E−01 |
| A16 | −0.97380E−02 | 0.20568E−01 |
| A18 | −0.14262E−01 | 0.00000E+00 |
| A20 | −0.26342E−02 | 0.00000E+00 |

Table 9 shows specifications of the objective lens in Examples 3-8 and values used in the expression $(SAG_1-SAG_2)\cdot(N_{405}-1)/\{NA\cdot f/(1+|m|)^{1/2}\}$ concerning the shapes stated above.

TABLE 9

| | Example 3 | Example 4 | Example 5 | Example 6 | Example 7 | Example 8 |
|---|---|---|---|---|---|---|
| Wavelength (μm) | 405 | 405 | 405 | 405 | 405 | 405 |
| Focal length: f (mm) | 1.765 | 1.412 | 0.588 | 2.225 | 2.050 | 1.073 |
| Image side numerical aperture: NA | 0.851 | 0.852 | 0.850 | 0.850 | 0.850 | 0.850 |
| Magnification: m | 0 | 0 | 0 | −0.0586 | −0.0727 | −0.0927 |
| Diameter of diaphragm (mm) | 3.00 | 2.40 | 1.00 | 4.00 | 3.74 | 2.00 |
| Values of expression for forms | 0.486 | 0.525 | 0.532 | 0.585 | 0.595 | 0.647 |

What is claimed is:

1. An objective lens system for an optical pickup apparatus, comprising in order from an object side:
    (a) a first lens group having negative paraxial power $P_1$ (mm$^{-1}$); and
    (b) a second lens group having positive paraxial power $P_2$ (mm$^{-1}$) for converging a light flux emitted from the first lens group on an information recording surface of an optical information recording medium,
    wherein the negative paraxial power $P_1$ (mm$^{-1}$) of the first lens group and the positive paraxial power $P_2$ (mm$^{-1}$) of the second lens group satisfy the following expression, $0.02 < |P_1/P_2| < 0.30.$ 2. The objective lens system of claim 1, wherein a numerical aperture on an image side is 0.8 or more.

3. The objective lens system of claim 1, wherein a diameter D (mm) of the light flux entering the objective lens system, satisfies the following expression, $0.7 < D < 3.0.$ 4. The objective lens system of claim 1, wherein the second lens group comprises a single lens.

5. The objective lens system of claim 4, wherein the first lens group comprises a single lens.

6. The objective lens system of claim 5, wherein a surface on the object side of the first lens group is a convex surface.

7. The objective lens system of claim 6, wherein the first lens group is a planoconcave lens, and a flat surface side thereof has a phase structure.

8. The objective lens system of claim 4, wherein a focal length f (mm) of the objective lens system and on-axis thickness $d_2$ (mm) of the second lens group satisfy the following expression, $0.7 \leq d_2/f \leq 1.4.$ 9. The objective lens system of claim 4, wherein a refractive index $N_{d2}$ of the second lens group for d line satisfies the following expression, $1.60 \leq N_{d2} \leq 1.85.$ 10. The objective lens system of claim 9, wherein the second lens group is a glass lens.

11. The objective lens system of claim 4, wherein a focal length $f_2$ (mm) of the second lens group and an Abbe's number $\nu_{d2}$ of the second lens for d line satisfy the following expression, $f_2/\nu_{d2} \leq 0.05.$ 12. The objective lens system of claim 11, wherein an Abbe's number $\nu_{d1}$ of the first lens group for d line and the Abbe's number $\nu_{d2}$ of the second lens group for d line satisfy the following expression, $\nu_{d1} < \nu_{d2}.$ 13. The objective lens system of claim 1, wherein a magnification of the objective lens system is substantially zero.

14. The objective lens system of claim 13, wherein the magnification $m_2$ of the second lens group in which spherical aberration correction is optimized, satisfies the following expression, $-0.15 \leq m_2 \leq -0.03.$ 15. The objective lens system of claim 1, wherein the objective lens system has a phase structure of a diffractive structure or an optical path difference providing structure, and is capable of converging each of plural light fluxes each having a different wavelength on an information recording surface of each of plural optical information recording media each having different recording density.

16. The objective lens system of claim 15, wherein each of plural optical information recording media has a protective layer that is thinner when recording density is higher.

17. The objective lens system of claim 15, wherein the first lens group has the phase structure.

18. The objective lens system of claim 15, wherein the wavelengths of the plural light fluxes include the first wavelength within a range from 380 to 420 nm and the second wavelength within a range from 630 to 680 nm.

19. The objective lens system of claim 15, wherein the wavelengths of the plural light fluxes include the first wavelength within a range from 380 to 420 nm, the second wavelength within a range from 630 to 680 nm, and the third wavelength within a range from 740 to 840 nm.

20. The objective lens system of claim 1, wherein the first lens group and the second lens group are held so that relative positions thereof is constant.

21. An optical pickup apparatus comprising:
    (a) a light source;
    (b) an objective lens system described in claim 1; and
    (c) a light-receiving system that receives light reflected on the information recording surface of the optical information recording medium,
    wherein recording and reproducing of information are conducted by converging a light flux emitted from the light source on the information recording surface of the optical information recording medium through the objective lens system.

22. A driving apparatus for an optical information recording medium in which the optical pickup apparatus described in claim 21 is housed, wherein recording and reproducing of information are conducted by the optical pickup apparatus which moves freely in the radial direction of the optical information recording medium for a rotating optical information recording medium.

* * * * *